US012626930B2

(12) United States Patent
Wu et al.

(10) Patent No.: US 12,626,930 B2
(45) Date of Patent: May 12, 2026

(54) ELECTROCHEMICAL TREATMENT OF ELECTRODES COMPRISING BIMETALLIC AND TRIMETALLIC CATALYSTS

(71) Applicant: Honda Motor Co., Ltd., Tokyo (JP)

(72) Inventors: Haibin Wu, Santa Clara, CA (US); Shutang Chen, Livermore, CA (US); Gugang Chen, Palo Alto, CA (US)

(73) Assignee: Honda Motor Co., Ltd., Tokyo (JP)

( * ) Notice: Subject to any disclaimer, the term of this patent is extended or adjusted under 35 U.S.C. 154(b) by 461 days.

(21) Appl. No.: 18/232,015

(22) Filed: Aug. 9, 2023

(65) Prior Publication Data

US 2025/0054998 A1      Feb. 13, 2025

(51) Int. Cl.
*H01M 4/92* (2006.01)
*H01M 4/88* (2006.01)

(52) U.S. Cl.
CPC ............. *H01M 4/926* (2013.01); *H01M 4/88* (2013.01); *H01M 4/921* (2013.01)

(58) Field of Classification Search
CPC ... B01J 23/38; B01J 23/70; B01J 23/89; B01J 37/34; B01J 37/348; H01M 4/926; H01M 4/88; H01M 4/921; C01P 2006/40
USPC ............... 502/5, 101, 182, 184, 185; 205/57
See application file for complete search history.

(56) References Cited

U.S. PATENT DOCUMENTS

| | | | |
|---|---|---|---|
| 3,715,238 A * | 2/1973 | Mayell ................... | H01M 4/921 |
| | | | 502/101 |
| 7,341,655 B2 * | 3/2008 | Waite ................... | C02F 1/46109 |
| | | | 205/710 |
| 9,680,161 B2 | 6/2017 | Yang et al. | |
| 2003/0000843 A1 * | 1/2003 | Biegert ................... | B01J 37/348 |
| | | | 422/177 |
| 2007/0003822 A1 * | 1/2007 | Kocha ................... | H01M 4/926 |
| | | | 429/535 |

(Continued)

FOREIGN PATENT DOCUMENTS

| | | | | |
|---|---|---|---|---|
| WO | WO-03073542 A2 * | 9/2003 | ............ | H01M 4/928 |
| WO | WO-2023200818 A1 * | 10/2023 | ............ | C01G 51/40 |

OTHER PUBLICATIONS

PCT International Search Report and Written Opinion dated Oct. 11, 2024, for International Patent Application No. PCT/US2024/038335.

(Continued)

*Primary Examiner* — Patricia L. Hailey
(74) *Attorney, Agent, or Firm* — Patterson + Sheridan, LLP

(57) ABSTRACT

Aspects of the present disclosure generally relate to processes for forming electrodes comprising bimetallic catalysts and to processes for forming electrodes comprising trimetallic catalysts. In an aspect, a process for making an electrode comprising carbon-supported metal alloy nanoparticles is provided. The process includes applying a plurality of first voltage cycles to an initial electrode, the initial electrode including metal alloy nanoparticles that includes platinum and one or more Group 8-11 metals, the one or more Group 8-11 metals free of Pt; and a carbon source. The process further includes applying a plurality of second voltage cycles to form a final electrode, the metal alloy nanoparticles of the final electrode having an oxygen reduction reaction (ORR) mass activity that is greater than the ORR mass activity of the initial electrode.

20 Claims, 6 Drawing Sheets

100

110

APPLY A PLURALITY OF FIRST VOLTAGE CYCLES TO AN INITIAL ELECTRODE COMPRISING METAL NANOPARTICLES

120

APPLY A PLURALITY OF SECOND VOLTAGE CYCLES TO THE RESULTANT ELECTRODE TO FORM A FINAL ELECTRODE

(56) References Cited

U.S. PATENT DOCUMENTS

| | | | |
|---|---|---|---|
| 2011/0003683 A1* | 1/2011 | Hays | B01J 23/42 |
| | | | 204/192.15 |
| 2022/0411944 A1 | 12/2022 | Harutyunyan et al. | |
| 2023/0294076 A1* | 9/2023 | Chen | H01M 4/925 |
| | | | 502/339 |

OTHER PUBLICATIONS

Zhao, Ke et al.—"Bimetallic catalysts as electrocatalytic cathode materials for the oxygen reduction reaction in microbial fuel cell: A review," vol. 8, pp. 1043-1070, Green Energy & Environment, Online, Oct. 22, 2022, https://doi.org/10.1016/j.gee.2022.10.007.

Fankhauser, S.; Smith, S. M.; Allen, M.; Axelsson, K.; Hale, T.; Hepburn, C.; Kendall, J. M.; Khosla, R.; Lezaun, J.; Mitchell-Larson, E.; et al. The meaning of net zero and how to get it right. Nature Climate Change 2022, 12 (1), 15-21. DOI: 10.1038/s41558-021-01245-w.

Manoharan, Y.; Hosseini, S. E.; Butler, B.; Alzhahrani, H.; Senior, B. T. .; Ashuri, T.; Krohn, J. Hydrogen Fuel Cell Vehicles; Current Status and Future Prospect. Applied Sciences 2019, 9 (11), 2296.

Wang, X. X.; Swihart, M. T.; Wu, G. Achievements, challenges and perspectives on cathode catalysts in proton exchange membrane fuel cells for transportation. Nature Catalysis 2019, 2 (7), 578-589. DOI: 10.1038/s41929-019-0304-9.

Nørskov, J. K.; Rossmeisl, J.; Logadottir, A.; Lindqvist, L.; Kitchin, J. R.; Bligaard, T.; Jonsson, H. Origin of the Overpotential for Oxygen Reduction at a Fuel-Cell Cathode. The Journal of Physical Chemistry B 2004, 108 (46), 17886-17892. DOI: 10.1021/jp047349j.

Tian, X.; Zhao, X.; Su, Y. Q.; Wang, L.; Wang, H.; Dang, D.; Chi, B.; Liu, H.; Hensen, E. J. M.; Lou, X. W. D.; et al. Engineering bunched Pt—Ni alloy nanocages for efficient oxygen reduction in practical fuel cells. Science 2019, 366 (6467), 850-856. DOI: 10.1126/science.aaw7493 From NLM PubMed-not-MEDLINE.

Kawaguchi, T.; Komanicky, V.; Latyshev, V.; Cha, W.; Maxey, E. R.; Harder, R.; Ichitsubo, T.; You, H. Electrochemically Induced Strain Evolution in Pt—Ni Alloy Nanoparticles Observed by Bragg Coherent Diffraction Imaging. Nano Lett 2021, 21 (14), 5945-5951. DOI: 10.1021/acs.nanolett.1c00778 From NLM Medline.

Sievers, G. W.; Jensen, A. W.; Quinson, J.; Zana, A.; Bizzotto, F.; Oezaslan, M.; Dworzak, A.; Kirkensgaard, J. J. K.; Smitshuysen, T. E. L.; Kadkhodazadeh, S.; et al. Self-supported Pt—CoO networks combining high specific activity with high surface area for oxygen reduction. Nat Mater 2021, 20 (2), 208-213. DOI: 10.1038/s41563-020-0775-8 From NLM PubMed-not-MEDLINE.

Kuttiyiel, K. A.; Choi, Y.; Hwang, S.-M.; Park, G.-G.; Yang, T.-H.; Su, D.; Sasaki, K.; Liu, P.; Adzic, R. R. Enhancement of the oxygen reduction on nitride stabilized pt-M (M=Fe, Co, and Ni) core-shell nanoparticle electrocatalysts. Nano Energy 2015, 13, 442-449. DOI: https://doi.org/10.1016/j.nanoen.2015.03.007.

Jayasayee, K.; Veen, J. A. R. V.; Manivasagam, T. G.; Celebi, S.; Hensen, E. J. M.; de Bruijn, F. A. Oxygen reduction reaction (ORR) activity and durability of carbon supported PtM (Co, Ni, Cu) alloys: Influence of particle size and non-noble metals. Applied Catalysis B: Environmental 2012, 111-112, 515-526. DOI: https://doi.org/10.1016/j.apcatb.2011.11.003.

* cited by examiner

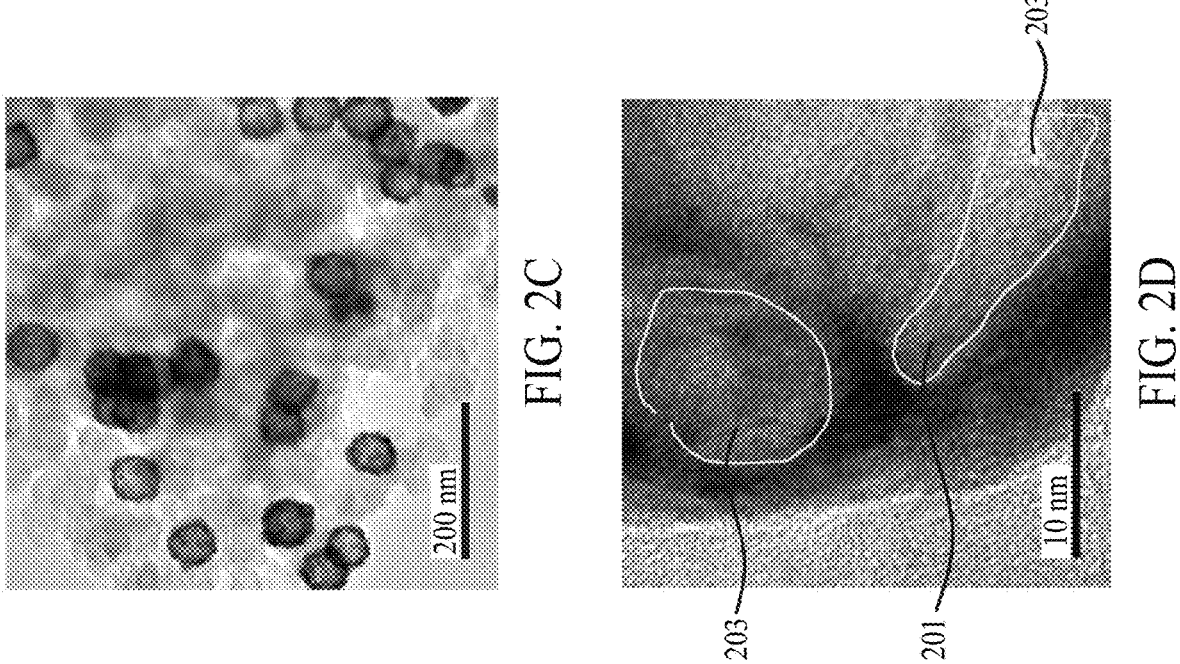
FIG. 2C
FIG. 2D
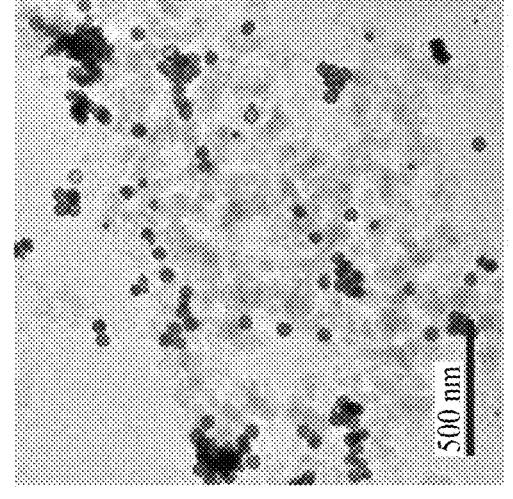
FIG. 2A
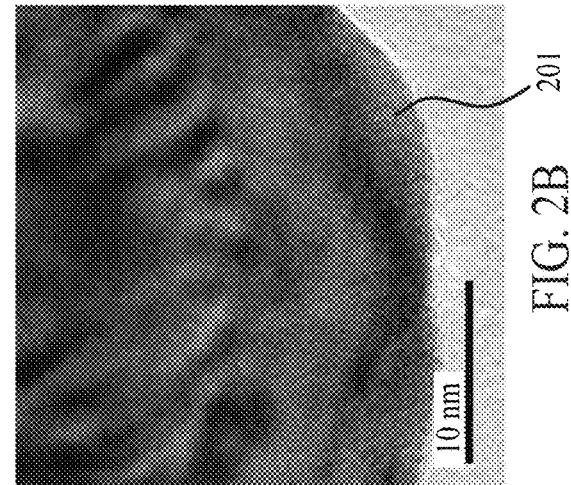
FIG. 2B

ELECTROCHEMICAL TREATMENT OF ELECTRODES COMPRISING BIMETALLIC AND TRIMETALLIC CATALYSTS

FIELD

Aspects of the present disclosure generally relate to processes for forming electrodes comprising bimetallic catalysts and to processes for forming electrodes comprising trimetallic catalysts.

BACKGROUND

Platinum (Pt) and its alloys are widely used as fuel cell electrode materials due to their exceptional catalytic performance. However, the current catalytic performance of these materials does not yet meet the demands of large-scale industrial applications. While platinum-nickel (PtNi) systems demonstrate better activity compared to typical catalysts like pure platinum and platinum-cobalt (PtCo) alloy, their limited durability has become a bottleneck in employing them as fuel cell cathode electrode materials. Overall, conventional Pt catalysts and Pt alloy catalysts lack the durability and high activity required for widespread acceptance. With the rapid growth in market demand for fuel cell products, there is a need to develop durable, highly active catalysts.

There is a need for new and improved processes for forming electrodes comprising bimetallic catalysts and trimetallic catalysts having, for example, improved performance.

SUMMARY

Aspects of the present disclosure generally relate to processes for forming electrodes comprising bimetallic catalysts and to processes for forming electrodes comprising trimetallic catalysts. The bimetallic catalysts and trimetallic catalysts can be in the form of nanoparticles. The nanoparticles can be supported on carbon. Unlike conventional technologies which utilize voltages lower than +1.1 V to prevent catalyst destruction, processes described herein can utilize a high-voltage treatment (for example, about +1.3 V or more) of the catalysts to, for example, form new reactive crystalline facets, increase its durability, increase its mass activity, reduce its overpotential, increase its voltage efficiency, or combinations thereof, among other enhancements. That is, processes described herein can improve catalyst performance.

In an aspect, a process for making an electrode comprising carbon-supported metal alloy nanoparticles is provided. The process includes applying a plurality of first voltage cycles from about 0 V to about +1.1 V to an initial electrode, the initial electrode including metal alloy nanoparticles comprising platinum and one or more Group 8-11 metals, the one or more Group 8-11 metals free of Pt; and a carbon source. The process further includes applying a plurality of second voltage cycles from an initial potential ranging from about −0.2 V to about 0 V to a final potential of at least +1.2 V to form a final electrode, the metal alloy nanoparticles of the final electrode having an oxygen reduction reaction (ORR) mass activity that is greater than the ORR mass activity of the initial electrode.

In another aspect, a process for improving an oxygen reduction reaction (ORR) mass activity of a carbon supported catalyst is provided. The process includes exposing an initial electrode comprising a carbon supported catalyst to a plurality of first voltage cycles comprising: (a) ramping the voltage from about 0 V to about +1.1 V; (b) ramping the voltage from about +1.1 V to about 0 V; and (c) repeating (a) and (b) at least 10 times. The process further includes exposing the resultant electrode to a plurality of second voltage cycles to form a final electrode, comprising: (d) ramping the voltage from an initial potential ranging from about −0.2 V to about 0 V to a final potential ranging from about +1.2 V to about +1.5 V; (e) ramping the voltage from the final potential to the initial potential; and (f) repeating (d) and (e) at least 20 times, wherein the carbon supported catalyst comprises metal alloy nanoparticles and a carbon source, the metal alloy nanoparticles comprising Pt and one or more Group 8-11 metals, the one or more Group 8-11 metals free of Pt; and wherein the final electrode has an oxygen reduction reaction mass activity that is at least 20% more than the ORR mass activity of the initial electrode.

In another aspect, a process for treating an electrode is provided. The process includes (a) performing a cycle of sweeping a first potential continuously at least 10 times in cyclic voltammetry on an initial electrode comprising a carbon supported catalyst, wherein the first potential comprises a range of a first initial potential to a first final potential, the first initial potential ranging from about 0 V to about +0.2 V, the first final potential ranging from about +0.9 V to about +1.1 V; and then (b) performing a cycle of sweeping a second potential continuously at least 20 times in cyclic voltammetry on the resultant electrode to form a final electrode, wherein the second potential comprises a range of a second initial potential to a second final potential, the second initial potential ranging from about −0.2 V to about 0 V, the second final potential ranging from about +1.2 V to about +1.5 V, the carbon supported catalyst comprises bimetallic alloy nanoparticles, trimetallic alloy nanoparticles, or combinations thereof, the bimetallic alloy nanoparticles and the trimetallic alloy nanoparticles comprising platinum and at least one Group 8-11 metal selected from the group consisting of Fe, Ru, Os, Co, Rh, Ir, Ni, Pd, Cu, Ag, Au, and combinations thereof.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only exemplary aspects and are therefore not to be considered limiting of its scope, for the disclosure may admit to other equally effective aspects.

FIGS. 2A and 2B show a transmission electron microscopy (TEM) image and a high-resolution transmission electron microscopy (HR-TEM) image, respectively, of the initial state of example PtNiCu catalyst nanoparticles.

FIGS. 2C and 2D show a TEM image and a HR-TEM image, respectively, of example PtNiCu catalyst nanoparticles after submitting the catalyst nanoparticles to processes described herein.

DETAILED DESCRIPTION

Figure 1:
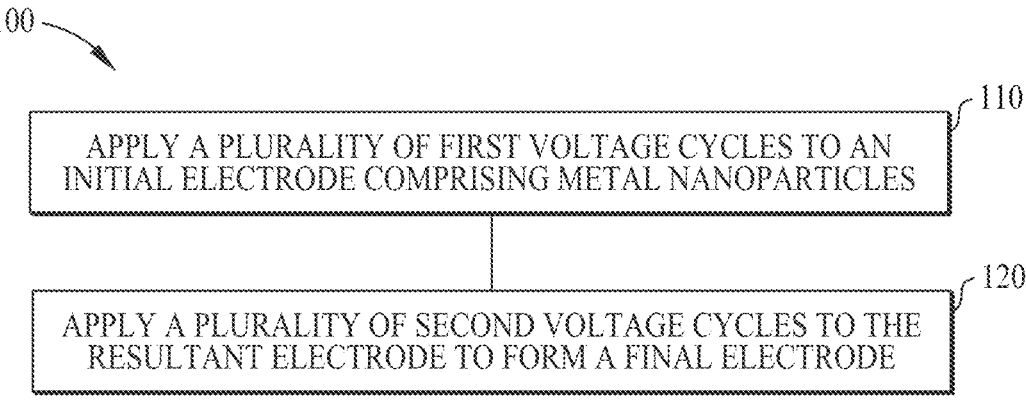
FIG. 1 is a flowchart showing selected operations of a process for forming electrodes comprising catalyst nanoparticles according to at least one aspect of the present disclosure.

Aspects of the present disclosure generally relate to processes for forming electrodes comprising bimetallic catalysts and to processes for forming electrodes comprising trimetallic catalysts. The inventors have found processes that can, for example, increase the durability and activity of the catalyst relative to those formed by conventional technologies. Briefly, and in some aspects, processes described herein include a novel electrochemical treatment operation that involves application of a voltage to bimetallic catalyst nanoparticles (for example, PtNi) or trimetallic catalyst nanoparticles (for example, PtNiCu). Relative to catalyst nanoparticles that are not subjected to processes described herein, the catalyst nanoparticles or nanocrystals of the present disclosure can have new reactive crystalline facets, increased durability, increased mass activity, reduced overpotential, increased voltage efficiency, or combinations thereof, among other differences. That is, the electrochemical treatment described herein improves the overall performance and stability of these catalysts, making them more suitable for large-scale fuel cell applications. The improved catalyst nanoparticles formed by aspects described herein can help address the current challenges faced by the fuel cell industry. By providing more robust and efficient electrode materials, aspects described herein can contribute to the advancement of fuel cell products and the growth of the clean energy market.

Aspects of the present disclosure can address, for example, the challenge of rapid performance decline in catalysts used for fuel cell cathode electrodes after long-term durability tests. To overcome this challenge and improve the durability of catalyst nanoparticles, and in some aspects, the inventors have found a unique electrochemical treatment method for improving bimetallic catalyst nanoparticles (such as nanoparticles comprising platinum (Pt) and a Group 8-11 metal different from Pt, such as PtNi) and trimetallic catalyst nanoparticles (such as nanoparticles comprising Pt and two Group 8-11 metals different from Pt, such as PtNiCu). In some aspects, the inventors show that application of a high voltage oxidation in a CV scan at a potential where water is just oxidized simultaneously can reconstruct the surface of the catalyst nanoparticles. For example, a potential of about +1.3V or more can oxidize both water and the catalyst surface, resulting in the creation of new structures. As a result, for example, the durability performance in oxidation reduction reactions (ORR) of the treated catalysts can be significantly improved. The significantly improved durability can be reflected by, for example, the increased mass activity and reduced overpotential compared to the original state of the catalyst nanoparticles. To the inventors' knowledge, processes described herein and resulting catalyst nanoparticles have never been reported. Processes described herein can enable more stable and efficient fuel cell cathode electrode materials, addressing the long-standing challenge of catalyst durability in the field.

The use of headings is for purposes of convenience only and does not limit the scope of the present disclosure. Aspects described herein can be combined with other aspects.

As used herein, a "composition" can include component(s) of the composition, reaction product(s) of two or more components of the composition, and/or a remainder balance of remaining starting component(s). Compositions of the present disclosure can be prepared by any suitable mixing process.

As used herein, a "bimetallic structure" can include component(s) of the bimetallic structure, reaction product(s) of two or more components of the bimetallic structure, and/or a remainder balance of remaining starting component(s).

As used herein, a "trimetallic structure" can include component(s) of the trimetallic structure, reaction product(s) of two or more components of the trimetallic structure, and/or a remainder balance of remaining starting component(s).

As described above, platinum (Pt) and its alloys are widely used as fuel cell electrode materials due to their exceptional catalytic performance. However, the current catalytic performance of Pt and Pt alloy materials do not meet the demands of large-scale industrial applications. Aspects described herein can address the challenges associated with future energy production, marked by the rapid development of low-carbon or zero-carbon emission technologies due to rising energy demands and concerns about climate change. Fuel cells, particularly hydrogen fuel cells, can be efficient energy conversion systems used in various vehicles, including cars, long-haul trucks, and even future ocean-going ships and aircraft. However, the limitations of fuel cells include the high cost of catalysts, fuel production, and poor cathodic reaction efficiency (for example, low current density and large overpotential of the ORR). Additionally, rapid performance degradation during long-term durability testing restricts the broad-scale use of fuel cells to meet energy demands.

As the anodic process (hydrogen oxidation) has faster kinetics than oxygen reduction, aspects described herein can improve the efficiency of the cathodic reaction. Catalysts used as electrode materials significantly impact the cathodic reaction efficiency, as demonstrated by various studies. In light of this need, binary (bimetallic) and trinary (trimetallic) Pt alloy nanocrystals for ORR have been developed. Although the performance of these catalysts in terms of kinetic currents, mass activities, and durability has been improved compared to conventional Pt/C, PtCo/C, and even PtNi/C, the overpotentials and kinetic currents associated with Pt alloy nanocrystals continue to degrade during durability testing.

As further described below, the inventors discovered an electrochemical treatment that can maintain or increase the activity of an ORR catalyst during long-term testing. After the treatment, the overpotentials and kinetic currents may no longer degrade with durability cycles. In fact, the performance can be restored to an even higher level than the initial condition. In some examples, the inventors examined overpotential, electrochemically active surface area (ECSA), and kinetic currents. Moreover, as a result of processes described herein, the inventors discovered that new peaks can appear in the cyclic voltammogram in regions where there should be none. The data can reveal a correlation between the performance improvement and the appearance of these peaks. Overall, processes described herein can, for example, enable improved performance of Pt-based alloy nanostructures in ORR.

Processes

Aspects of the present disclosure generally relate to processes for forming carbon-supported bimetallic catalyst nanoparticles and carbon-supported catalyst nanoparticles. Briefly, and in some aspects, the process can include loading bimetallic nanoparticles or trimetallic nanoparticles on a carbon support, surface activation of the resultant carbon-supported nanoparticles, and an electrochemical treatment of the activated carbon-supported nanoparticles.

The electrochemical treatment operation can include application of a voltage (for example, about 1.1 volts (V) or more, such as from about +1.2 V to about +1.5 V, such as from about +1.3 V to about +1.5 V) to the carbon supported nanoparticles. The inventors found that the electrochemical treatment can reconstruct the surface atomic arrays of the nanoparticles, resulting in the formation of nanoparticles having more active surface facets. While conventional cyclic voltammetry (CV) treatments utilize voltages lower than 1.1 V to prevent catalyst destruction, aspects described herein show that higher voltage treatments can actually improve catalyst performance and durability. As a result, the mass activities and electrochemically active surface area of the catalysts can even increase after a certain number durability cycles. To the inventors' knowledge, this is the first report of using electrochemical treatments to enhance the catalytic performance of Pt—Ni and Pt—Ni—Cu catalysts in cathodic fuel cell reactions. The approach described herein can provide a simple and effective way to improve the long-term performance of catalysts in fuel cell applications, addressing the challenges of durability and activity that have thus far limited the widespread adoption of these materials.

FIG. 1 is a flowchart showing selected operations of a process 100 for forming an electrode comprising metal nanoparticles according to at least one aspect of the present disclosure. In some aspects, the process can be utilized for improving, for example, an oxygen reduction reaction (ORR) mass activity of the electrode.

In some aspects, the process can include utilizing cyclic voltammetry. In cyclic voltammetry, an applied working electrode potential (applied voltage) is ramped linearly versus time in cyclical phases. Here, after the set potential (or final potential) is reached, the working electrode's potential is ramped in the opposite direction to return to the initial potential. Such cycles of ramps can be repeated one or more times.

The rate of voltage change over time during each cyclical phase is referred to as a scan rate, sweep rate. During a forward scan (for example, from $t_0$ to $t_1$), an increasing potential is applied beginning at an initial potential (or a lower end potential) until the set potential (or an upper end potential or final potential) is reached. During a reverse scan (for example, from $t_1$ to $t_2$), a decreasing potential is applied beginning at the set potential (or upper end potential) until the initial potential (or lower end potential).

Referring back to FIG. 1, the process 100 can include applying a plurality of first voltage cycles to an initial electrode at operation 110. Operation 110 can be referred to as a pretreatment operation.

The initial electrode utilized for operation 110 can comprise metal nanoparticles and a carbon source. The metal nanoparticles can be supported on the carbon source such that the initial electrode can comprise carbon-supported metal nanoparticles. The metal nanoparticles can include catalysts such as those catalysts utilized for oxygen reduction reactions (ORR). The metal nanoparticles can be bimetallic nanoparticles, trimetallic nanoparticles, or combinations thereof. The metal nanoparticles include platinum (Pt) alloyed with a transition metal. The metal nanoparticles can include platinum (Pt) alloyed with a Group 8-11 metal of the periodic table of the elements such as iron (Fe), ruthenium (Ru), osmium (Os), cobalt (Co), rhodium (Rh), iridium (Ir), nickel (Ni), palladium (Pd), copper (Cu), silver (Ag), gold (Au), or combinations thereof, such as Co, Ni, Fe, Cu, or combinations thereof. In at least one aspect, the bimetallic nanoparticles comprise PtNi. In at least one aspect, the trimetallic nanoparticles comprise PtNiCu. Non-limiting processes for forming bimetallic nanoparticles and trimetallic nanoparticles are described below.

Any suitable carbon source can be utilized for the electrode. Illustrative, but non-limiting, examples can include carbon black, carbon nanotube (for example, single wall carbon nanotube (CNT), double wall CNT, multiwall CNT, or combinations thereof), carbon nanofiber, mesoporous carbon, Vulcan carbon, carbon nanowire, acetylene black, graphite, graphene, graphene oxide, fullerene, or combinations thereof, among others.

As described above, the electrode comprises metal nanoparticles and a carbon source. A total amount (in weight percent) of metal nanoparticles in the electrode and a total amount (in weight percent) of carbon source in the electrode is no more than 100 wt %.

In some aspects, an amount of metal nanoparticles present in the electrode is from about 10 wt % to about 80 wt %, such as from about 20 wt % to about 70 wt %, such as from about 30 wt % to about 60 wt %, such as from about 40 wt % to about 50 wt %, based on a total amount of the metal nanoparticles and the carbon source, though other values are contemplated. Any of the foregoing numbers can be used singly to describe an open-ended range or in combination to describe a close-ended range.

In some aspects, an amount of carbon source present in the electrode is from about 20 wt % to about 90 wt %, such as from about 30 wt % to about 80 wt %, such as from about 40 wt % to about 70 wt %, such as from about 50 wt % to about 60 wt %, based on the total amount of the metal nanoparticles and the carbon source, though other values are contemplated. Any of the foregoing numbers can be used singly to describe an open-ended range or in combination to describe a close-ended range.

Operation 110 can utilize cyclic voltammetry to activate (or pretreat) the metal nanoparticles of the initial electrode. Here, the initial electrode is exposed to a plurality of first voltage cycles. The plurality of first voltage cycles can include one or more first voltage cycles such as from about 10 voltage cycles to about 50 voltage cycles, such as from about 20 voltage cycles to about 40 voltage cycles, such as from about 30 voltage cycles to about 35 voltage cycles, though other values are contemplated. Any of the foregoing numbers can be used singly to describe an open-ended range or in combination to describe a close-ended range. Each first voltage cycle can comprise increasing (or ramping) the voltage from an initial potential to a final potential (or set potential) and then decreasing (or ramping) the voltage from the final potential (or set potential) to the initial potential.

The initial potential for operation 110 can range from about −0.2 V to about +0.2 V versus a reversible hydrogen electrode (RHE, or reference electrode), from about −0.2 V to about 0 V versus RHE, from about 0 V to about +0.2 V versus RHE, or from about −0.1 V to about +0.1 V versus RHE, though other values are contemplated. Any of the foregoing numbers can be used singly to describe an open-ended range or in combination to describe a close-ended range. In some aspects, the initial potential (in units of V) for operation 110 can be −0.2, −0.15, −0.1, −0.05, 0, +0.024, +0.05, +0.1, +0.15, or +0.2 versus RHE, though other values are contemplated. Each of the foregoing numbers can be preceded by the word "about," "at least about," "less than about," or "more than about," and any of the foregoing numbers can be used singly to describe an open-ended range or in combination to describe a close-ended range.

The final potential for operation 110 can range from about +0.7 V to about +1.1 V versus RHE, from about +0.9 V to +1.1 V versus RHE, from about +0.9 V to +1 V versus RHE, or from about +1 V to about +1.1 V versus RHE, though other values are contemplated. Any of the foregoing numbers can be used singly to describe an open-ended range or in combination to describe a close-ended range. In some aspects, the final potential (in units of V) for operation 110 can be +0.7, +0.75, +0.8, +0.85, +0.9, +0.95, +1, +1.05, or +1.1 versus RHE, though other values are contemplated. Each of the foregoing numbers can be preceded by the word "about," "at least about," "less than about," or "more than about," and any of the foregoing numbers can be used singly to describe an open-ended range or in combination to describe a close-ended range.

During operation 110, the ramping from the initial potential to the final potential and the ramping from the final potential to the initial potential can be performed at a selected scan rate (also referred to as a sweep rate). The scan rate can be from about 10 mV/s to about 500 mV/s, such as from about 20 mV/s to about 300 mV/s, such as from about 30 mV/s to about 200 mV/s, such as from about 40 mV/s to about 100 mV/s, such as from about 50 mV/s to about 75 mV/s, or from about 10 mV/s to about 100 mV/s, such as from about 20 mV/s to about 90 mV/s, such as from about 30 mV/s to about 80 mV/s, such as from about 40 mV/s to about 60 mV/s, such as about 50 mV/s, though other values are contemplated. Any of the foregoing numbers can be used singly to describe an open-ended range or in combination to describe a close-ended range. As used herein, the terms scan rate, sweep rate, and ramping rate are used interchangeably unless the context clearly indicates otherwise.

In some aspects of operation 110, the ramping up rate or scan rate (from initial potential to final potential) can be the same as or different from the ramping down rate or scan rate (from final potential to initial potential).

In some aspects, operation 110 can include performing a cycle of sweeping a potential continuously a certain number of times (e.g., 10 times or more) in cyclic voltammetry on an initial electrode comprising a carbon supported catalyst, wherein the potential comprises a range of an initial potential to a final potential.

Operation 110 can be performed in an electrolyte solution in a cell fitted with electrodes. The electrolyte solution can comprise any suitable solvent and any suitable electrolyte. In some aspects, the cell is fitted with two electrodes (a working electrode and a counter electrode) or three electrodes (a working electrode, a reference electrode, and a counter electrode). The working electrode is the electrode comprising the carbon-supported metal nanoparticles. The reference electrode can be any suitable stable and well known potential electrode such as a potassium chloride (KCl) saturated Ag/AgCl reference electrode and reversible hydrogen electrode. The reference electrode establishes the electrical potential against which other potentials may be measured. The counter electrode (or auxiliary electrode), along with the working electrode provides a circuit over which current is either applied or measured. The auxiliary electrode can be fabricated from any suitable material such as gold, platinum, or carbon (for example graphite rod).

The cell can be a rotating disk electrode (RDE) system. In such systems, the rotating disk electrode acts as the working electrode. The disk can have any suitable dimensions such as an inner diameter of about 0.15 $cm^2$ to about 0.3 $cm^2$, such as about 0.19 $cm^2$ to about 0.2 $cm^2$, such as about 0.196 $cm^2$, though other values are contemplated. Any of the foregoing numbers can be used singly to describe an open-ended range or in combination to describe a close-ended range. The disk can be rotated at any suitable speed, such as from about 100 rpm to about 4000 rpm, such as from about 400 rpm to about 3600 rpm, such as from about 1000 rpm to about 2000 rpm, though other values are contemplated. For the RDE system, the reference and counter electrode are also placed into the cell.

The electrolyte solution can be, or include, an aqueous (water) solution. The electrolyte can include perchloric acid ($HClO_4$), an alkali metal salt of perchlorate ($ClO_4^-$), sulfuric acid ($H_2SO_4$), an alkali metal salt of sulfate ($SO_4^{2-}$), nitric acid ($HNO_3$), an alkali metal salt of nitrate ($NO_3^-$), or combinations thereof. A concentration of electrolyte in water can be from about 0.1 M to about 1 M, depending on, for example, the electrolyte. For example, 0.1 M $HClO_4$ or 0.5 M $H_2SO_4$ can be used, though other molarities for electrolytes are contemplated.

The electrolyte solution can further include a non-reactive gas, such as argon (Ar), nitrogen ($N_2$), helium (He), krypton (Kr), xenon (Xe), or combinations thereof. Here, the non-reactive gas works to de-aerate the electrolyte solution such that the electrolyte solution can be saturated with the non-reactive gas. The electrolyte solution can be set to any desired temperature, such as greater than 0° C., less than about 100° C., or combinations thereof, such as from about 10° C. to about 70° C., such as about 20° C. to about 50° C., such as about 25° C. to about 40° C., though other values are contemplated. Any of the foregoing numbers can be used singly to describe an open-ended range or in combination to describe a close-ended range.

Operation 110 can result in an electrode comprising activated metal nanoparticles. The inventors found that, for example, operation 110 can act to clean active sites of the metal nanoparticles such that physically adsorbed molecules can be removed and the active sites of the metal nanoparticles being exposed to the electrolyte solution.

The process 100 can further include applying a plurality of second voltage cycles to the electrode resulting from operation 110 to form a "final" electrode at operation 120. Operation 120 can be referred to as an electrochemical treatment operation, a high-voltage treatment operation, or a high-voltage oxidation. In some aspects, operation 120 can be performed at a potential where water is oxidized. Overall, operation 120 can change the surface morphology of catalysts (for example, forming new reactive crystalline facets). In addition, operation 120 can result in nanoparticles having improved catalyst performance increased durability, increased mass activity, reduced overpotential, increased voltage efficiency, or combinations thereof, among other enhancements.

Operation 120 can be performed in the same electrolyte solution, or a different electrolyte solution, as that used during operation 110. Operation 120 can utilize cyclic voltammetry to electrochemically treat the metal nanoparticles of the electrode. Here, the electrode is exposed to a plurality of second voltage cycles. The plurality of second voltage cycles can include one or more second voltage cycles such as from about 10 voltage cycles to about 500 voltage cycles, such as from about 20 voltage cycles to about 150 voltage cycles, such as from about 40 voltage cycles to about 60 voltage cycles, though other values are contemplated. Any of the foregoing numbers can be used singly to describe an open-ended range or in combination to describe a close-ended range. Each second voltage cycle can comprise increasing (or ramping) the voltage from an initial potential to a final potential (or set potential) and then decreasing (or ramping) the voltage from the final potential (or set potential) to the initial potential.

The initial potential for operation 120 can range from about −0.2 V to about +0.2 V versus a reversible hydrogen electrode (RHE, or reference electrode), from about −0.2 V to about 0 V versus RHE, from about 0 V to about +0.2 V versus RHE, or from about −0.1 V to about +0.1 V versus RHE, though other values are contemplated. Any of the foregoing numbers can be used singly to describe an open-ended range or in combination to describe a close-ended range. In some aspects, the initial potential (in units of V) for operation 120 can be −0.2, −0.15, −0.1, −0.05, 0, +0.025, +0.05, +0.1, +0.15, or +0.2 versus RHE, though other values are contemplated. Each of the foregoing numbers can be preceded by the word "about," "at least about," "less than about," or "more than about," and any of the foregoing numbers can be used singly to describe an open-ended range or in combination to describe a close-ended range.

The final potential for operation 120 can be greater than +1.1 V versus RHE. In some aspects, the final potential for operation 120 can range from greater than +1.1 V versus RHE, less than about +1.5 V versus RHE, or combinations thereof, such as from about +1.2 V to about +1.4 V versus RHE, such as from about 1.2 V to about +1.3 V versus RHE, though other values are contemplated. Any of the foregoing numbers can be used singly to describe an open-ended range or in combination to describe a close-ended range. In some aspects, the final potential (in units of V) for operation 120 can be +1.1, +1.15, +1.2, +1.25, +1.3, +1.35, +1.4, +1.45, or +1.5 versus RHE, though other values are contemplated. Each of the foregoing numbers can be preceded by the word "about," "at least about," "less than about," or "more than about," and any of the foregoing numbers can be used singly to describe an open-ended range or in combination to describe a close-ended range.

During operation 120, the ramping from the initial potential to the final potential and the ramping from the final potential to the initial potential can be performed at a selected scan rate (also referred to as a sweep rate). The scan rate can be from about 10 mV/s to about 500 mV/s, such as from about 20 mV/s to about 300 mV/s, such as from about 30 mV/s to about 200 mV/s, such as from about 40 mV/s to about 100 mV/s, such as from about 50 mV/s to about 75 mV/s, or from about 10 mV/s to about 100 mV/s, such as from about 20 mV/s to about 90 mV/s, such as from about 30 mV/s to about 80 mV/s, such as from about 40 mV/s to about 60 mV/s, such as about 50 mV/s, though other values are contemplated. Any of the foregoing numbers can be used singly to describe an open-ended range or in combination to describe a close-ended range.

In some aspects of operation 120, the ramping up rate or scan rate (from initial potential to final potential) can be the same as or different from the ramping down rate (from final potential to initial potential).

In some aspects, operation 120 can include performing a cycle of sweeping a potential continuously a certain number of times (e.g., at least 20 times) in cyclic voltammetry on the electrode resulting from operation 110, wherein the potential comprises a range of an initial potential to a final potential.

As described above, the electrolyte solution used for operation 120 can be the same or different electrolyte solution. The electrolyte solution used for operation 120 can be a fresh electrolyte solution. The electrolyte solution can be, or include, an aqueous (water) solution. The electrolyte can include perchloric acid ($HClO_4$), an alkali metal salt of perchlorate ($ClO_4^-$), sulfuric acid ($H_2SO_4$), an alkali metal salt of sulfate ($SO_4^{2-}$), nitric acid ($HNO_3$), an alkali metal salt of nitrate ($NO_3^-$), or combinations thereof. A concentration of electrolyte in water can be from about 0.1 M to about 1 M, depending on, for example, the electrolyte. For example, 0.1 M $HClO_4$ or 0.5 M $H_2SO_4$ can be used, though other molarities for electrolytes are contemplated.

The electrolyte solution used for operation 120 can further include a non-reactive gas, such as argon (Ar), nitrogen ($N_2$), helium (He), krypton (Kr), xenon (Xe), or combinations thereof. Here, the non-reactive gas works to de-aerate the electrolyte solution such that the electrolyte solution can be saturated with the non-reactive gas. During operation 120, the electrolyte solution can be set to any desired temperature, such as greater than 0° C., less than about 100° C., or combinations thereof, such as from about 10° C. to about 70° C., such as about 20° C. to about 50° C., such as about 25° C. to about 40° C., such as about 40° C. though other values are contemplated. Any of the foregoing numbers can be used singly to describe an open-ended range or in combination to describe a close-ended range.

Operation 120 can result in an electrode comprising surface cleaned metal nanoparticles. Operation 120 can freshen a surface (or surfaces) of the metal nanoparticles that become inert in long-term durability tests by forming new reactive crystalline facets. In addition, operation 120 can result in metal nanoparticles having improved catalyst performance increased durability, increased mass activity, reduced overpotential, increased voltage efficiency, or combinations thereof, among other enhancements.

In contrast to conventional methods that utilize voltages lower than +1.1 V to prevent catalyst destruction, operation 120 can be performed at voltages where the set potential (or final potential) is greater than +1.1 V, such as about +1.2 V or more, such as from about +1.2 V to about +1.5 V, such as from about +1.2 V to about +1.3 V or other voltages.

The operations of process 100 can result in dissolution of certain atoms of the metal nanoparticles. As a result, the nanoparticles can segregate and re-construct, leading to surface defects. Such defects can include kinks, terraces, boundaries, ledges, terrace-ledges, adatoms, adatom clusters, advacancies, advacancy clusters, or combinations thereof, among other defects.

Following process 100, the metal nanoparticles of the "final electrode" (i.e., the electrode resulting from operation 120) can have one or more of the following properties.

(a) The metal nanoparticles present in the final electrode (after process 100) can be characterized as having an oxygen reduction reaction (ORR) mass activity that is greater than the ORR mass activity of the metal nanoparticles of the initial electrode (before process 100). In some aspects the ORR mass activity of the metal nanoparticles of the final electrode is from about 0.1 A/mg(Pt) to about 20 A/mg(Pt), such as from about 1 A/mg(Pt) to about 7 A/mg(Pt), such as from about from about 2 A/mg(Pt) to about 6 A/mg(Pt). Any of the foregoing numbers can be used singly to describe an open-ended range or in combination to describe a close-ended range. The ORR mass activity is determined as follows: kinetic current/platinum mass on the electrode. The mass activity is a value that kinetic current is normalized by Pt mass. For an electrode, the mass is supposed to be stable, so we only compare the current which can be obtained from ORR linear sweep voltammetry (LSV).

(b) The metal nanoparticles present in the final electrode (after process 100) can be characterized as having an ORR mass activity that is a certain percent greater than (or improved over) the ORR mass activity of the metal nanoparticles of the initial electrode (before process 100) in the long term test. In some aspects, an increase in ORR mass activity of the metal nanoparticles of the final electrode to that of the initial electrode is about 1% or more, such as about 5% or more, such as about 10% or more, such as about 15% or more, such as about 20% or more, such as about 25% or more, such as about 30% or more, such as about 35% or more, such as about 40% or more, such as about 45% or more, such as about 50% or more, such as about 55% or more, such as about 60% or more, such as about 300% or less, such as about 205% or less, such as about 200% or less, such as about 100% or less. Any of the foregoing numbers can be used singly to describe an open-ended range or in combination to describe a close-ended range. For example, an increase in ORR mass activity of the metal nanoparticles of the final electrode to that of the initial electrode can be from about 1% to about 300%, such as from about 5% to about 250%, such as from about 10% to about 200%, such as from about 15% to about 150%, such as from about 20% to about 100%, such as from about 30% to about 90%. The percent increase in mass activity is determined by the following equation:

$$\left(ORR \text{ mass activity}_{final} - ORR \text{ mass activity}_{initial}\right)$$
$$/(ORR \text{ mass activity}_{initial}) \times 100 \text{ where } ORR \text{ mass}$$
$$\text{activity}_{initial} \text{ is the initial } ORR \text{ mass activity of the}$$
$$\text{metal nanoparticles (before performing process 100),}$$
$$ORR \text{ mass activity}_{final} \text{ is the mass activity after performing}$$
$$\text{process 100. Each of the } ORR \text{ mass activity}_{initial} \text{ and}$$
$$ORR \text{ mass activity}_{final} \text{ are determined at 0.9 V with}$$
$$\text{a reference to a reversible hydrogen electrode } (V_{RHE}).$$

where ORR mass activity$_{initial}$ is the initial ORR mass activity of the metal nanoparticles (before performing process 100), ORR mass activity$_{final}$ is the mass activity after performing process 100. Each of the ORR mass activity$_{initial}$ and ORR mass activity$_{final}$ are determined at 0.9 V with a reference to a reversible hydrogen electrode ($V_{RHE}$).

(c) The metal nanoparticles present in the final electrode (after process 100) can be characterized as having a mass activity (in units of A/mg(Pt)) of 0.01, 0.08, 0.15, 0.4, 0.44, 0.5, 1, 1.5, 2, 3, 3.5, 4, 4.5, 5, 5.5, 6, 6.5, 7, 7.5, 8, 8.5, 9, 9.5, or 10, though higher or lower mass activities are contemplated. Each of the foregoing numbers can be preceded by the word "about," "at least 10 about," "less than about," or "more than about," and any of the foregoing numbers can be used singly to describe an open-ended range or in combination to describe a close-ended range. For example, the mass activity (in units of A/mg(Pt)) can be about 2, at least about 0.5, or from about 1 to about 9. The mass activity is determined at 0.9V with a reference to a reversible hydrogen electrode ($V_{RHE}$).

(d) The metal nanoparticles present in the final electrode (after process 100) can be more durable than that of conventional technologies. Excellent durabilities can be observed even after 300,000 cycles. The metal nanoparticles can be characterized as having a percent loss of mass activity (in units of percent, %) after 300,000 cycles of 0, 1, 2, 3, 4, 5, 6, 7, 8, 9, 10, 15, 20, 25, 30, 35, or 40, though higher or lower mass activities are contemplated. Each of the foregoing numbers can be preceded by the word "about," "at least about," "less than about," or "more than about," and any of the foregoing numbers can be used singly to describe an open-ended range or in combination to describe a close-ended range. For example, the percent loss of mass activity can be about 40% or less, about 30% or less, or from about 1% to about 10%. The percent loss of mass activity is determined by the following equation:

$$\left(\text{mass activity}_{final} - \text{mass activity}_{initial}\right)/(\text{mass activity}_{initial}) \times 100$$

where mass activity$_{initial}$ is the initial mass activity of the metal nanoparticles, mass activity$_{final}$ is the mass activity after 30,000 cycles. Each of the mass activity$_{initial}$ and mass activity$_{final}$ are determined at 0.9V with a reference to a reversible hydrogen electrode ($V_{RHE}$).

The metal nanoparticles present in the final electrode (after process 100) can show an unexpected increase in mass activity even after 30,000 cycles. In contrast, conventional technologies such as Pt/C shows a 40% loss of mass activity after only 6,000 cycles. Such results indicate the excellent durability of the electrodes.

Electrode preparation: The electrode utilized for process 100 can be prepared by any suitable method. In some aspects, the electrode can be prepared by mixing a mixture comprising the metal nanoparticles, the carbon source, a solvent, and an electrolyte. Any suitable solvent such as aqueous solvents, alcohol solvents, glycol solvents, or combinations thereof can be utilized. In at least one aspect, the solvent comprises or is selected from the group consisting of water, distilled water, methanol, ethanol, isopropanol, ethylene glycol, tetraethylene glycol, or combinations thereof. In some aspects, a solvent mixture, for example an 80/20 water/isopropanol mixture can be utilized. Any suitable electrolyte can be used. In some aspects, the electrolyte can be a perfluorinated resin, a fluoropolymer-copolymer, or combinations thereof such as Nafion (Aldrich). The electrolyte can be in the form of a solution in for example water and/or a lower aliphatic alcohol. After mixing by suitable methods such as sonication, the metal nanoparticles, carbon source, solvent, and electrolyte form a slurry. Next, the slurry can be aspirated with a pipette and applied onto a disk electrode followed by drying.

Synthesis of Bimetallic Nanoparticles

Bimetallic nanoparticles useful for processes described herein (for example, process 100) can be formed by any suitable method, such as that described in U.S. Non-Provisional patent application Ser. No. 17/696,531, which is incorporated by reference in its entirety. The bimetallic nanoparticles can be bimetallic nanoframes.

In some aspects, bimetallic nanoparticles may be formed according to the following non-limiting operations. A first precursor and a second precursor can be introduced and reacted to form a first bimetallic structure, where the first precursor comprises a metal ($M^1$), the second precursor comprises a Group 8-11 metal ($M^2$), wherein $M^1$ is platinum (Pt), and wherein $M^2$ is free of Pt. A third precursor comprising Pt can then be reacted with the first bimetallic structure at a temperature of about 80° C. to about 300° C. to form a second bimetallic structure, the second bimetallic structure having a higher molar ratio of Pt to Group 8-11 metal than that of the first bimetallic structure. The second bimetallic structure can then be introduced with an acid to form a bimetallic nanoparticle, the bimetallic nanoparticle having a higher molar ratio of Pt to Group 8-11 metal than that of the second bimetallic structure, the bimetallic nanoparticle having the formula:

$$(Pt)_a(M^2)_b,$$

wherein:

a is the amount of Pt;

b is the amount of $M^2$; and a molar ratio of a:b is from about 99:1 to about 25:75.

Implementations of the process for forming the bimetallic nanoparticle can include one or more of the following. The Group 8-11 metal can include Fe, Ru, Os, Co, Rh, Ir, Ni, Pd, Cu, Ag, Au, or combinations thereof. The Group 8-11 metal can be selected from the group consisting of Ni, Fe, Co, Pd, Au, Ag, and combinations thereof. The Group 8-11 metal can be selected from the group consisting of Ni, Fe, Co, or combinations thereof. The bimetallic nanoparticle formed according to the process can have an X-ray diffraction pattern having a diffraction peak at {111}, {200}, {220}, {311}, or combinations thereof. The bimetallic nanoparticle formed according to the process can be a bimetallic nanoframe, the bimetallic nanoframe comprising an interior that is at least partially hollow; and a plurality of facets encapsulating the interior, each facet of the plurality of facets comprising metal atoms. About 70% or more of the metal atoms present in the plurality of facets can be Pt. About 85% or more of the metal atoms present in the plurality of facets can be Pt. The second bimetallic structure and the acid can be mixed at a temperature of about 10° C. to about 60° C. The acid can include acetic acid, sulfuric acid, phosphoric acid, perchloric acid, or combinations thereof. The first precursor includes a Group 10-11 metal and may be in the form of a Group 10-11 metal complex. The second precursor includes a Group 8-11 metal and may be in the form of a Group 8-11 metal complex.

The Group 10-11 metal complex of the first precursor can be made by introducing a Group 10-11 metal source with a nitrogen-containing compound under conditions effective to form the Group 10-11 metal complex. The Group 10-11 metal complex can be, for example, a metal amine such as a platinum amine. The Group 10-11 metal source includes a Group 10-11 metal, for example, Ni, Pd, Pt, Cu, Ag, Au, or combinations thereof. The Group 10-11 metal source can further include one or more ligands such as halide (for example, $I^-$, $Br^-$, $Cl^-$, or $F^-$), acetylacetonate ($O_2C_5H_7^-$), hydride ($H^-$), $SCN^-$, $NO_2^-$, $NO_3^-$, $N_3^-$, $OH^-$, oxalate ($C_2O_4^{2-}$), $H_2O$, acetate ($CH_3COO^-$), $O_2^-$, $CN^-$, $OCN^-$, $OCN^-$, $CNO^-$, $NH_2^-$, $NH^{2-}$, $NC^-$, $NCS^-$, $N(CN)_2^-$, pyridine (py), ethylenediamine (en), 2,2'-bipyridine (bipy), $PPh_3$, or combinations thereof. In some aspects, the Group 10-11 metal of the Group 10-11 metal source includes platinum, copper, and/or another Group 10-11 metal. Illustrative, but non-limiting, examples of the Group 10-11 metal source include platinum halides, platinum acetates, platinum nitrates, other suitable platinum species, copper acetates, copper halides, copper nitrates, and/or other suitable copper species. Hydrates are also contemplated. Examples of Group 10-11 metal source include, but are not limited to, hexachloroplatinic acid (or hydrates thereof, for example, $H_2PtCl_6 \cdot 6H_2O$), platinum chloride ($PtCl_4$), potassium platinum(II) chloride ($K_2PtCl_4$), platinum(II) acetate (Pt $(CH_3CO_2)_2$), platinum(IV) acetate ($Pt(CH_3CO_2)_4$), sodium hexachloroplatinate hexahydrate ($Na_2PtCl_6 \cdot 6H_2O$), and platinum(II) acetylacetonate ($Pt(C_5H_7O_2)_2$), The nitrogen-containing compound can include OLA, ODA, HDA, DDA, TDA, or combinations thereof. The nitrogen-containing compound can also be utilized as a solvent. When desired, a solvent such as octadecene, phenyl ether, benzyl ether, or combinations thereof can additionally, or alternatively, be used. In some aspects, the molar ratio of Group 10-11 metal to nitrogen-containing compound is from about 1:20 to about 1:1, such as from about 1:10 to about 1:1, such as from about 1:4 to about 1:1, such as from about 1:2 to about 1:1. The molar ratio of Group 10-11 metal source to nitrogen-containing compound is based on the starting material molar ratio used for the reaction.

Conditions effective to form the Group 10-11 metal complex of the first precursor (for example, the metal amine such as the platinum amine) can include a reaction temperature and a reaction time. The reaction temperature to form the Group 10-11 metal complex can be greater than about 40° C., such as greater than about 60° C., such as greater than about 80° C., such as from about 100° C. to about 320° C., such as from about 110° C. to about 310° C., such as from about 120° C. to about 300° C., such as from about 130° C. to about 290° C., such as from about 140° C. to about 280° C., such as from about 150° C. to about 270° C., such as from about 160° C. to about 260° C., such as from about 170° C. to about 250° C., such as from about 180° C. to about 240° C., such as from about 190° C. to about 230° C., such as from about 200° C. to about 220° C. In some aspects, the reaction temperature to form the Group 10-11 metal complex can be from about 150° C. to about 250° C. or from about 180° C. to about 240° C. Higher or lower temperatures can be used when appropriate. The reaction time to form the Group 10-11 metal complex can be about 1 minute (min) or more or about 24 h or less, such as from about 1 min to about 12 h, such as from about 5 min to about 6 hours (h), such as from about 10 min to about 5.5 h, such as from about 15 min to about 5 h, such as from about 30 min to about 4 h, such as from about 45 min to about 3 h, such as from about 1 h to about 2 h. The reaction time to form the Group 10-11 metal complex can be more or less depending on, for example, the level of conversion desired. Any suitable pressure can be used during formation of the Group 10-11 metal complex.

The Group 8-11 metal complex of the second precursor can be formed by introducing a Group 8-11 metal source with a nitrogen-containing compound under conditions effective to form the Group 8-11 metal complex. The nitrogen-containing compound can be the same or different than those described above. The Group 8-11 metal source includes a Group 8-11 metal of the periodic table of the elements, such as Fe, Ru, Os, Co, Rh, Ir, Ni, Pd, Pt, Cu, Ag, Au, or combinations thereof, such as Fe, Co, Ni, Pd, Pt, Cu, Ag, Au, or combinations thereof. The Group 8-11 metal source can further include one or more ligands such as halide ($I^-$, $Br^-$, $Cl^-$, or $F^-$), acetylacetonate ($O_2C_5H_7^-$), hydride ($H^-$), $SCN^-$, $NO_2^-$, $NO_3^-$, $N_3^-$, $OH^-$, oxalate ($C_2O_4^{2-}$), $H_2O$, acetate ($CH_3COO^-$), $O_2^-$, $CN^-$, $OCN^-$, $OCN^-$, $CNO^-$, $NH^{2-}$, $NH^{2-}$, $NC^-$, $NCS^-$, $N(CN)_2^-$, pyridine (py), ethylenediamine (en), 2,2'-bipyridine (bipy), $PPh_3$, or combinations thereof. In some aspects, the Group 8-11 metal source includes metal acetates, metal acetalacetonates, metal halides, metal nitrates, and/or other Group 8-11 metal species. Illustrative, but non-limiting, examples of the Group 8-11 metal source include nickel(II) acetylacetonate, nickel (II) nitrate, nickel(II) chloride, cobalt(II) acetylacetonate, iron(II) acetylacetonate, hydrates thereof, and combinations thereof. Examples of the Group 8-11 metal source can also include Au, Ag, and Pd having the same or similar ligands, and combinations thereof. Hydrates of one or more of the aforementioned materials are also contemplated.

Conditions effective to form the Group 8-11 metal complex (for example, the Group 8-11 metal amine) of the second precursor can include similar conditions for forming the Group 10-11 metal complex described above.

The Group 10-11 metal complex (first precursor) and the Group 8-11 metal complex (second precursor) are introduced to form the first bimetallic structure. The molar ratio of the first precursor (for example, the Group 10-11 metal complex) to second precursor (for example, the Group 8-11 metal complex) can be adjusted as desired. In some examples, the molar ratio the Group 10-11 metal complex to the Group 8-11 metal complex is about 5:1, from about 10:1 to about 2:1, or at least about 1:1. In some examples, the molar ratio of the Group 10-11 metal complex to the Group 8-11 metal complex is from about 100:1 to about 1:100, such as from about 50:1 to about 1:50, such as from about 20:1 to about 1:20, such as from about 10:1 to about 1:10, such as from about 5:1 to about 1:5, such as from about 3:1 to about 1:3, such as about 1:1 or from about such as from about 1:1 to about 1:2. The molar ratio is determined based on the starting material molar ratio used for the reaction. The operating temperature (° C.) can be about 400° C. or less, about 150° C. to about 275° C., or more than about 150° C. In some aspects, the operating temperature is about 400° C. or less, such as from about 50° C. to about 400° C., such as from about 75° C. to about 375° C., such as from about 100° C. to about 350° C., such as from about 125° C. to about 325° C., such as from about 150° C. to about 300° C., such as from about 175° C. to about 275° C., such as from about 200° C. to about 250° C., such as from about 200° C. to about 225° C. In some aspects, the operating temperature can be set to a temperature of about 100° C. to about 150° C. or from about 180° C. to about 320° C. In some aspects, a combination of two or more temperatures can be utilized. The time for forming the first bimetallic structure can be about 1 min or more or about 24 h or less, such as from about 5 min to about 6 h, such as from about 10 min to about 1 h, though greater or lesser periods of time are contemplated. Forming the first bimetallic structure can include stirring, mixing, and/or agitating the mixture to ensure, for example, homogeneity of the mixture. Forming the first bimetallic structure can include using a non-reactive gas (such as $N_2$ and/or Ar) to remove or substantially remove oxygen from the mixing environment. Suitable operating pressures can be utilized for operation.

The first bimetallic structure formed can then be introduced with a third precursor to form a second bimetallic structure. This is a metal ion treatment where the third precursor, for example, a Group 10-11 metal complex, is reacted with the first bimetallic structure. The resulting second bimetallic structure can have a higher concentration of Group 10-11 metal than that of the first bimetallic structure, a lower concentration of Group 8-11 metal than that of the first bimetallic structure. The Group 10-11 metal complex of the third precursor can be made by introducing a Group 10-11 metal source with a nitrogen containing compound. The Group 10-11 metal complex can be made in the same or similar manner as that described above, though other methods are contemplated.

For the metal ion treatment, amounts of the Group 10-11 metal complex of the third precursor can be adjusted relative to the first bimetallic structure. For example, the molar ratio of the first bimetallic structure to the Group 10-11 metal complex can be less than about 500:1, greater than about 1:1, or from about 10:1 to about 1:10 based on the starting material molar ratio used for the reaction. In some aspects, the molar ratio of the first bimetallic structure to the Group 10-11 metal complex can be from about 200:1 to about 1:100, such as from about 150:1 to about 1:150, such as from about 100:1 to about 1:100 based on the starting material molar ratio used for the reaction. In some aspects, the molar ratio of the first bimetallic structure to the Group 10-11 metal complex can be from about 1:50 to about 1:2, such as from about 1:20 to about 1:5, such as from about 1:10 to about 1:8. The molar ratio of the first bimetallic structure to the Group 10-11 metal complex is determined based on the starting material molar ratio used for the reaction.

When desired, a solvent such as octadecene, diphenyl ether, biphenyl, benzyl ether, phenyl ether, or combinations thereof can be used for forming the second bimetallic structure. Additionally, or alternatively, the solvent, when used, can include a nitrogen-containing compound such as OLA, ODA, HDA, DDA, TDA, or combinations thereof. For example, the first bimetallic structure and/or the third precursor comprising the Group 10-11 metal complex can be dispersed in a solvent.

The conditions for forming the second bimetallic structure can include introduction conditions and reaction conditions. The introduction conditions refer to the conditions at which the third precursor comprising the Group 10-11 metal complex is introduced to the first bimetallic structure and optional solvent by injection, addition, or otherwise combining the third precursor with the first bimetallic structure. The reaction conditions refer to the conditions at which the third precursor comprising the Group 10-11 metal complex and the first bimetallic structure are reacted. The introductions conditions and reaction conditions can be the same or different.

The introduction conditions for forming the second bimetallic structure includes an introduction temperature. The introduction temperature (° C.), or injection temperature, can be about 100° C. or more, 300° C. or less, or from about 125° C. to about 275° C. In some examples, the introduction temperature for introduction conditions can be about 400° C. or less, such as from about 50° C. to about 400° C., such as from about 75° C. to about 375° C., such as from about 80° C. to about 340° C., such as from about 90° C. to about 330° C., such as from about 100° C. to about 320° C., such as from about 110° C. to about 310° C., such as from about 120° C. to about 300° C., such as from about 130° C. to about 290° C., such as from about 140° C. to about 280° C., such as from about 150° C. to about 270° C., such as from about 160° C. to about 260° C., such as from about 170° C. to about 250° C., such as from about 180° C. to about 240° C., such as from about 190° C. to about 230° C., such as from about 200° C. to about 220° C. In some aspects, the introduction temperature for introduction conditions can be from about 80° C. to about 320° C., such as from about 80° C. to about 150° C. or from about 180° C. to about 320° C., such as from about 200° C. to about 300° C. Higher or lower introduction/injection temperatures can be used when appropriate. The resultant mixture containing the first bimetallic structure, the Group 10-11 metal complex, and the optional solvent, can be stirred, mixed or otherwise agitated at the introduction temperature for a time period of about 1 min or more or about 24 h or less, such as from about 1 min to about 12 h, such as from about 5 min to about 6 h, such as from about 10 min to about 3 h, such as from about 15 min to about 1 h. The introduction conditions can optionally include introducing $N_2$, Ar, and/or other non-reactive gases prior to, during, and/or after, introducing the third precursor comprising the Group 10-11 metal complex to the first bimetallic structure.

After introduction of the Group 10-11 metal complex to the first bimetallic structure, one or more components of the resultant mixture react, under reaction conditions, to form the second bimetallic structure. Here, the reaction conditions for forming the second bimetallic structure can include heating the mixture containing the first bimetallic structure, the Group 10-11 metal complex, and the optional solvent, at a reaction temperature of about 125° C. or more, 300° C. or less, or about 160° C. In some aspects, the reaction temperature of reaction conditions to form the second bimetallic structure about 80° C. to about 320° C., such as from about 80° C. to about 150° C. or from about 180° C. to about 320° C., such as from about 200° C. to about 300° C. Higher or lower temperatures can be used when appropriate. The reaction conditions to form the second bimetallic structure can include a time of about 1 min or more or about 24 or less, such as from about 1 min to about 12 h, such as from about 5 min to about 3 h, such as from about 10 min to about 1 h. Higher or lower temperatures and/or more or less periods of time can be used when appropriate. Stirring, mixing, and/or agitation can be performed to, for example, ensure homogeneity. The reaction conditions to form the second bimetallic structure can include introducing $N_2$, Ar, and/or other non-reactive gases before, during, and/or after reaction of the one or more components. In some examples, the reaction conditions to form the second bimetallic structure include an operating temperature that is higher than, less than, or equal to the temperature of the introduction conditions to form the second bimetallic structure.

After a suitable time, the reaction product mixture comprising the second bimetallic structure formed can be subjected to filtration, separation, cleaning, quenching, washing, purification, and/or other suitable processes to remove undesired components and isolate the second bimetallic structure from the other components of the reaction product mixture. For example, the reaction product mixture comprising the second bimetallic structure can be centrifuged to separate the second bimetallic structure (which may be in the form of particles) from the reaction product mixture. Additionally, or alternatively, the second bimetallic structure can be washed with polar solvent(s), such as water, acetone, ethanol, methanol, or combinations thereof, and/or non-polar solvent(s), such as hexane, pentane, toluene, or combinations thereof. Other solvents for washing can include ether solvents such as diethyl ether and tetrahydrofuran; chlorocarbon solvents such as dichloromethane and chloroform; as well as ethyl acetate, dimethylformamide, acetonitrile, benzene, isopropanol, n-butanol, n-propanol. Mixtures of two or more of these solvents, in suitable proportions, can be utilized for washing, purifying, or otherwise separating the second bimetallic structure from other components in the reaction product mixture. As an example, a solvent or mixture of solvents can be added to the second bimetallic structure and the resultant mixture centrifuged. The supernatant can be discarded and the remaining pellet can be dispersed in a suitable solvent or mixture of solvents. The resultant pellet and solvent(s) can then be centrifuged to obtain the second bimetallic structure.

The process to form the bimetallic nanoparticles can further include converting the second bimetallic structure to a third bimetallic structure (such as a bimetallic nanoparticle and/or bimetallic nanoframe). This conversion operation is typically an acid treatment or etching process where the second bimetallic structure is introduced to an acid to form the third bimetallic structure (e.g., the bimetallic nanoparticle). By subjecting the second bimetallic structure to an acid or etching treatment, the third bimetallic structure (e.g., the bimetallic nanoparticle) becomes at least partially hollow. The third bimetallic structure (e.g., the bimetallic nanoparticle) has a partially hollow, substantially hollow, or hollow interior.

Conditions effective to form the third bimetallic structure (e.g., the bimetallic nanoparticle) can include etching with an etching agent. Etching can include subjecting the second bimetallic structure to an etching treatment sufficient to form a third bimetallic structure (e.g., the bimetallic nanoparticle) having, for example, faces (or sides) that are at least partially disordered, defective, and/or porous. For example, the second bimetallic structure can have a regular rhombic dodecahedral morphology while the third bimetallic structure (e.g., the bimetallic nanoparticle) has an irregular rhombic dodecahedral morphology. Additionally, or alternatively, the third bimetallic structure (e.g., the bimetallic nanoparticle) is in the form of a nanoframe, for example, bimetallic nanoframe. The bimetallic nanoframe can be characterized as a bimetallic polyhedral nanoframe.

The etching process can be performed by immersing, soaking, introducing, or otherwise subjecting the second bimetallic structure to an acid. The acid can be an inorganic acid, an organic acid, or combinations thereof. Examples of acids include, but are not limited to, acetic acid ($CH_3COOH$), carbonic acid ($H_2CO_3$), propionic acid ($CH_3CH_2COOH$), perchloric acid ($HClO_4$), phosphoric acid ($H_3PO_4$), sulfuric acid ($H_2SO_4$), nitric acid ($HNO_3$), hydrochloric acid (HCl), or combinations thereof. The acid may be provided as a solution, for example, an aqueous solution. In some aspects, the concentration of acid in the aqueous solution is from about 0.01 M to about 10 M, such as from about 0.1 M to about 2 M, such as from about 0.5 M to about 1.5 M, such as from about 1 M to about 1.25 M. In some examples, a molar ratio of second bimetallic structure to acid is 1:500, 1:400, 1:300, 1:200, 1:100, 1:90, 1:80, 1:70, 1:60, 1:50, 1:40, 1:30, 1:20, 1:10, 1:5, 1:3, 1:2, or 1:1, though other molar ratios are contemplated. Each of the foregoing numbers can be preceded by the word "about," "at least about," "less than about," or "more than about," and any of the foregoing numbers can be used singly to describe an open-ended range or in combination to describe a close-ended range. For example, the molar ratio of second bimetallic structure to acid is about 1:1, about 1:200 or more (higher amount of second bimetallic structure), or less than about 1:10 (less amount of second bimetallic structure). In some examples, the molar ratio of second bimetallic structure to acid is from about 1:500 to about 1:1, such as from about 1:200 to about 1:1, such as from about 1:50 to about 1:1, such as from about 1:20 to about 1:1 based on the starting material molar ratio used for the reaction. In some aspects, the molar ratio of second bimetallic structure to acid is from about 1:10 to about 1:1, such as from about 1:5 to about 1:1, such as from about 1:2 to about 1:1 based on the starting material molar ratio used for the reaction.

When desired, a suitable solvent such as water, a hydrocarbon solvent (for example, octadecene) and/or an ether solvent (for example, phenyl ether) can be utilized.

Conditions effective to form the third bimetallic structure (e.g., the bimetallic nanoparticle) can include a reaction temperature and a reaction time. The reaction temperature (° C.) to form the third bimetallic structure (e.g., the bimetallic nanoparticle) can be greater than about −10° C., such as greater than about 0° C., such as greater than about 15° C., such as from about 20° C. to about 100° C., such as from about 30° C. to about 80° C., such as from about 40° C. to about 60° C., such as from about 45° C. to about 55° C. The reaction time to form the third bimetallic structure (e.g., the bimetallic nanoparticle) can be about 30 seconds or more and/or about 168 h or less, such as from about 1 min to about 80 h, such as from about 5 min to about 48 h, such as from about 30 min to about 24 h, though other durations are contemplated. The reaction time to form the third bimetallic structure (e.g., the bimetallic nanoparticle) can be more or less depending on, for example, the level of conversion desired. Any suitable pressure can be used during formation of the third bimetallic structure (e.g., the bimetallic nanoparticle). Conditions effective to form the third bimetallic structure (e.g., the bimetallic nanoparticle) can include stirring, mixing, and/or agitation via, for example, sonication. Conditions can optionally include utilizing a non-reactive gas, such as $N_2$ and/or Ar. For example, a second bimetallic structure and etching agent can be placed under these or other non-reactive gases to, for example, degas various components or otherwise remove oxygen from the reaction mixture.

In some aspects, the reaction product comprising the third bimetallic structure (e.g., the bimetallic nanoparticle) can be subjected to filtration, separation, cleaning, quenching, washing, purification, and/or other suitable processes to remove undesired components and isolate the third bimetallic structure (e.g., the bimetallic nanoparticle) from the other components of the reaction mixture. For example, the reaction product comprising the third bimetallic structure (e.g., the bimetallic nanoparticle) can be centrifuged to separate the third bimetallic structure from the mixture. Additionally, or alternatively, the third bimetallic structure (e.g., the bimetallic nanoparticle) can be washed with polar solvent(s), such as water, acetone, ethanol, methanol, or combinations thereof, and/or non-polar solvent(s), such as hexane, pentane, toluene, or combinations thereof. Other solvents for washing can include ether solvents such as diethyl ether and tetrahydrofuran; chlorocarbon solvents such as dichloromethane and chloroform; as well as ethyl acetate, dimethylformamide, acetonitrile, benzene, isopropanol, n-butanol, n-propanol. Mixtures of two or more of these solvents, in suitable proportions, can be utilized for washing, purifying, or otherwise separating the third bimetallic structure from other components in the reaction mixture. As an example, a solvent or a mixture of solvents can be added to the third bimetallic structure and the resultant mixture centrifuged. The supernatant can be discarded and the remaining pellet can be dispersed in a suitable solvent or mixture of solvents. The resultant pellet and solvent(s) can then be centrifuged to obtain the third bimetallic structure (e.g., the bimetallic nanoparticle). In these and other aspects, the pellet comprising the third bimetallic structure (e.g., the bimetallic nanoparticle) can be re-solubilized or re-suspended in a suitable solvent such as water or those described above.

The bimetallic nanoparticles formed as described above (or different bimetallic nanoparticles) can used for process 100.

Synthesis of Trimetallic Nanoparticles

Trimetallic nanoparticles useful for processes described herein (for example, process 100) can be formed by any suitable method, such as that described in U.S. Non-Provisional patent application Ser. No. 17/709,130, which is incorporated by reference in its entirety. The trimetallic nanoparticles can be trimetallic nanoframes.

In some aspects, trimetallic nanoparticles may be formed according to the following non-limiting operations. The first operation can include introducing a Group 8-11 metal complex with a mixture comprising a phosphorous-containing compound and Group 10-11 metal complex to form a bimetallic structure.

The Group 10-11 metal complex can be made by, e.g., introducing a Group 10-11 metal source with a nitrogen-containing compound under conditions effective to form the Group 10-11 metal complex. The Group 10-11 metal complex can be, e.g., a copper amine or a nickel amine. The Group 10-11 metal source can include one or more ligands such as halide (e.g., $I^-$, $Br^-$, $Cl^-$, or $F^-$), acetylacetonate ($O_2C_5H_7^-$), hydride ($H^-$), $SCN^-$, $NO_2^-$, $NO_3^-$, $N_3^-$, $OH^-$, oxalate ($C_2O_4^{2-}$), $H_2O$, acetate ($CH_3COO^-$), $O_2^-$, $CN^-$, $OCN^-$, $OCN^-$, $CNO^-$, $NH_2^-$, $NH_2^-$, $NC^-$, $NCS^-$, $N(CN)_2^-$, pyridine (py), ethylenediamine (en), 2,2'-bipyridine (bipy), $PPh_3$, or combinations thereof. In some aspects, the Group 10-11 metal of the Group 10-11 metal source includes copper and/or nickel. Illustrative, but non-limiting, examples of the Group 10-11 metal source include copper acetates, copper halides, copper nitrates, other suitable copper species, nickel acetates, nickel halides, nickel nitrates, and/or other suitable nickel species.

The nitrogen-containing compound can be those described above. Illustrative, but non-limiting, examples of the nitrogen-containing compound include OLA, ODA, HDA, DDA, TDA, or combinations thereof. The nitrogen-containing compound can be utilized as a solvent. When desired, a solvent such as octadecene, phenyl ether, benzyl ether, or combinations thereof can additionally, or alternatively, be used. In some examples, the molar ratio of Group 10-11 metal source to nitrogen-containing compound is from about 1:1000 to about 1:1, such as from about 1:500 to about 1:1, such as from about 1:100 to about 1:1, such as from about 1:50 to about 1:1 based on the starting material molar ratio used for the reaction. In some aspects, the molar ratio of Group 10-11 metal source to nitrogen-containing compound is from about 1:20 to about 1:1, such as from about 1:10 to about 1:1, such as from about 1:4 to about 1:1, such as from about 1:2 to about 1:1 based on the starting material molar ratio used for the reaction.

Conditions effective to form the Group 10-11 metal complex (e.g., a copper amine or nickel amine) can include a reaction temperature and a reaction time. The reaction temperature to form the Group 10-11 metal complex can be greater than about 40° C., such as greater than about 60° C., such as greater than about 80° C., such as from about 100° C. to about 320° C., such as from about 110° C. to about 310° C., such as from about 120° C. to about 300° C., such as from about 130° C. to about 290° C., such as from about 140° C. to about 280° C., such as from about 150° C. to about 270° C., such as from about 160° C. to about 260° C., such as from about 170° C. to about 250° C., such as from about 180° C. to about 240° C., such as from about 190° C. to about 230° C., such as from about 200° C. to about 220° C. In some aspects, the reaction temperature to form the Group 10-11 metal complex can be from about 150° C. to about 250° C. or from about 180° C. to about 240° C. Higher or lower temperatures can be used when appropriate. The reaction time to form the Group 10-11 metal complex can be about 1 minute (min) or more or about 24 h or less, such as from about 1 min to about 12 h, such as from about 5 min to about 6 hours (h), such as from about 10 min to about 5.5 h, such as from about 15 min to about 5 h, such as from about 30 min to about 4 h, such as from about 45 min to about 3 h, such as from about 1 h to about 2 h. The reaction time to form the Group 10-11 metal complex can be more or less depending on, e.g., the level of conversion desired. Any suitable pressure can be used during formation of the Group 10-11 metal complex.

Conditions effective to form the Group 10-11 metal complex (e.g., the copper amine or nickel amine) can include stirring, mixing, and/or agitation. Conditions effective to form the Group 10-11 metal complex can optionally include utilizing a non-reactive gas, such as $N_2$ and/or Ar. For example, a mixture of the Group 10-11 metal source and the nitrogen-containing compound can be placed under these or other non-reactive gases to, e.g., degas various components or otherwise remove oxygen from the reaction mixture.

In some aspects, the Group 10-11 metal complex can be kept in the form of a stock solution/suspension. In other aspects, the reaction product comprising the Group 10-11 metal complex can be subjected to filtration, separation, cleaning, quenching, washing, purification, and/or other suitable processes to remove undesired components and isolate the Group 10-11 metal complex from the other components of the reaction mixture. For example, the reaction product comprising the Group 10-11 metal complex (which may be in the form of particles) can be centrifuged to separate the Group 10-11 metal complex from the mixture. Additionally, or alternatively, the Group 10-11 metal complex can be washed with polar solvent(s), such as water, acetone, ethanol, methanol, or combinations thereof, and/or non-polar solvent(s), such as hexane, pentane, toluene, or combinations thereof. Other solvents for washing can include ether solvents such as diethyl ether and tetrahydrofuran; chlorocarbon solvents such as dichloromethane and chloroform; as well as ethyl acetate, dimethylformamide, acetonitrile, benzene, isopropanol, n-butanol, n-propanol. Mixtures of two or more of these solvents, in suitable proportions, can be utilized for washing, purifying, or otherwise separating the Group 10-11 metal complex from other components in the reaction mixture. As an example, a solvent or a mixture of solvents can be added to the Group 10-11 metal complex and the resultant mixture centrifuged. The supernatant can be discarded and the remaining pellet can be dispersed in a suitable solvent or mixture of solvents. The resultant pellet and solvent(s) can then be centrifuged to obtain the Group 10-11 metal complex. In these and other aspects, the pellet comprising the Group 10-11 metal complex can be re-solubilized or re-suspended in a nitrogen-containing compound such as those described above.

The first operation includes forming a mixture of the Group 10-11 metal complex and the phosphorous-containing compound. Illustrative, but non-limiting, examples of phosphorous-containing compounds include alkylphosphines and/or arylphosphines such as trimethylphosphine, triethylphosphine, tripropylphosphine, tributylphosphine, tripentylphosphine, trihexylphosphine, trioctylphosphine, tricyclohexylphosphine, diethylphosphine, dibutylphosphine, diphenylphosphine, dimethylethylphosphine, triphenylphosphine, isomers thereof, derivatives thereof, and combinations thereof.

The mixture can be formed under conditions that includes an operating temperature and a duration of time. The operating temperature of conditions can be set to about 400° C. or less, such as from about 50° C. to about 400° C., such as from about 75° C. to about 375° C., such as from about 100° C. to about 350° C., such as from about 125° C. to about 325° C., such as from about 150° C. to about 300° C., such as from about 175° C. to about 275° C., such as from about 200° C. to about 250° C., such as from about such as from about 200° C. to about 225° C. In some aspects, the operating temperature of conditions can be set to a temperature of about 100° C. to about 150° C. or from about 180° C. to about 320° C. Higher or lower temperatures can be used when appropriate. The time for forming the mixture can be about 1 min or more or about 24 h or less, such as from about 5 min to about 6 h, such as from about 10 min to about 1 h, though greater or lesser periods of time are contemplated. Conditions can include stirring, mixing, and/or agitating the mixture to ensure, e.g., homogeneity of the mixture. Conditions can be performed using a non-reactive gas (e.g., $N_2$ and/or Ar) to, e.g., remove or substantially remove oxygen from the mixing environment. Suitable operating pressures can be utilized.

Additionally, the molar ratio of the Group 10-11 metal complex to the phosphorous-containing compound can be adjusted as desired. In some examples, the molar ratio of the Group 10-11 metal complex to the phosphorous-containing compound is from about 50:1 to about 1:100, such as from about 20:1 to about 1:50, such as from about 10:1 to about 1:10 based on the starting material molar ratio used for the reaction. In some aspects, the molar ratio of the Group 10-11 metal complex to the phosphorous-containing compound is from about 5:1 to about 1:5, such as from about 3:1 to about 1:3, such as from about 1:1 to about 1:2 based on the starting material molar ratio used for the reaction.

In some aspects, and prior to making a mixture of the Group 10-11 metal complex and the phosphorous-containing compound, the phosphorous-containing compound can be mixed with a solvent. The solvent can be, or include, a nitrogen-containing compound, such as those described above. Additionally, or alternatively, other suitable solvents can be used. The solvent(s) and the phosphorous-containing compound can be heated under a non-reactive gas (e.g., $N_2$ and/or Ar) at a temperature of about 50° C. or more to about 400° C. or less, such as from about 75° C. to about 375° C., such as from about 100° C. to about 350° C., such as from about 125° C. to about 325° C., such as from about 150° C. to about 300° C., such as from about 175° C. to about 275° C., such as from about 200° C. to about 250° C., such as from about such as from about 200° C. to about 225° C., for a suitable time such as about 24 h or less, such as about 12 h or less, such as about 5 h or less, such as about 1 h or less, such as about 30 min or less, such as about 10 min or less and under suitable pressures. In these and other aspects, the Group 10-11 metal complex is then added to the phosphorous-containing compound and optional solvent. The resulting mixture can then be cooled to those temperatures of the first conditions described above, such as from about 50° C. to about 400° C., such as from about 75° C. to about 375° C., such as from about 100° C. to about 350° C., such as from about 125° C. to about 325° C., such as from about 150° C. to about 300° C., such as from about 175° C. to about 275° C., such as from about 200° C. to about 250° C., such as from about such as from about 200° C. to about 225° C. for a suitable time (described above), under suitable pressures, and optionally under a non-reactive gas (e.g., $N_2$ and/or Ar).

To form the bimetallic structure in the first operation, a Group 8-11 metal complex can be introduced to the mixture. Amounts of the Group 8-11 metal complex can be adjusted relative to one or more components of the mixture, e.g., the Group 10-11 metal complex and the phosphorous-containing compound. For example, the molar ratio of Group 8-11 metal complex to the phosphorous-containing compound can be from about 1:500 to about 1:50, such as from about 1:250 to about 1:70, such as from about 1:120 to about 1:100 based on the starting material molar ratio used for the reaction. In some aspects, the molar ratio of Group 8-11 metal complex to the phosphorous-containing compound can be from about 1:50 to about 1:1, such as from about 1:20 to about 1:5, such as from about 1:10 to about 1:8 based on the starting material molar ratio used for the reaction.

Additionally, or alternatively, the molar ratio of the Group 8-11 metal complex to the Group 10-11 metal complex can be from about 100:1 to about 1:10, such as from about 80:1 to about 1:20, such as from about 50:1 to about 1:30 based on the starting material molar ratio used for the reaction. In some aspects, the molar ratio of the Group 8-11 metal complex to the Group 10-11 metal complex can be from about 1:1 to about 1:10, such as from about 1:2 to about 1:7, such as from about 1:3 to about 1:4 based on the starting material molar ratio used for the reaction.

When desired, a solvent such as octadecene, benzyl ether, phenyl ether, or combinations thereof can be used for operation. In some aspects, the Group 8-11 metal complex is introduced to the mixture as a solution/suspension in a solvent. For example, a nitrogen-containing compound, such as those described above, can be utilized as a solvent.

The first operation can include introduction conditions and reaction conditions. The introduction conditions refer to the conditions at which the Group 8-11 metal complex is introduced to the mixture comprising the Group 10-11 metal complex, the phosphorous-containing compound, and optional solvent by, e.g., injection, addition, or otherwise combining the Group 8-11 metal complex with the mixture. The reaction conditions refer to the conditions at which the Group 8-11 metal complex and one or more components of the mixture are reacted. The introduction conditions and reaction conditions can be the same or different.

The introduction conditions include an introduction temperature. The introduction temperature, or injection temperature, can be about 400° C. or less, such as from about 50° C. to about 400° C., such as from about 75° C. to about 375° C., such as from about 80° C. to about 340° C., such as from about 90° C. to about 330° C., such as from about 100° C. to about 320° C., such as from about 110° C. to about 310° C., such as from about 120° C. to about 300° C., such as from about 130° C. to about 290° C., such as from about 140° C. to about 280° C., such as from about 150° C. to about 270° C., such as from about 160° C. to about 260° C., such as from about 170° C. to about 250° C., such as from about 180° C. to about 240° C., such as from about 190° C. to about 230° C., such as from about 200° C. to about 220° C. In some aspects, the introduction temperature or injection temperature of can be from about 80° C. to about 320° C., such as from about 80° C. to about 150° C. or from about 180° C. to about 320° C., such as from about 200° C. to about 300° C. Higher or lower introduction/injection temperatures can be used when appropriate.

The resultant mixture containing the Group 10-11 metal complex, the phosphorous-containing compound, the Group 8-11 metal complex, and the optional solvent, can be stirred, mixed or otherwise agitated at the introduction temperature for a time period of about 1 min or more or about 24 h or less, such as from about 1 min to about 12 h, such as from about 5 min to about 6 h, such as from about 10 min to about 3 h, such as from about 15 min to about 1 h. The introduction conditions can optionally include introducing $N_2$, Ar, and/or other non-reactive gases prior to, during, and/or after, introducing the Group 8-11 metal complex to the mixture.

After introduction of the Group 8-11 metal complex to the mixture, one or more components of the resultant mixture react, under reaction conditions, to form the bimetallic structure. Here, the reaction conditions can include heating the mixture containing the Group 10-11 metal complex, the phosphorous-containing compound, the Group 8-11 metal complex, and the optional solvent, at a reaction temperature of about 400° C. or less, such as from about 50° C. to about 400° C., such as from about 75° C. to about 375° C., such as from about 80° C. to about 340° C., such as from about 90° C. to about 330° C., such as from about 100° C. to about 320° C., such as from about 110° C. to about 310° C., such as from about 120° C. to about 300° C., such as from about 130° C. to about 290° C., such as from about 140° C. to about 280° C., such as from about 150° C. to about 270° C., such as from about 160° C. to about 260° C., such as from about 170° C. to about 250° C., such as from about 180° C. to about 240° C., such as from about 190° C. to about 230° C., such as from about 200° C. to about 220° C. In some aspects, the reaction temperature can be from about 80° C. to about 320° C., such as from about 80° C. to about 150° C. or from about 180° C. to about 320° C., such as from about 200° C. to about 300° C. Higher or lower temperatures can be used when appropriate. The reaction conditions can include a time of about 1 min or more or about 24 or less, such as from about 1 min to about 12 h, such as from about 5 min to about 3 h, such as from about 10 min to about 1 h. Higher or lower temperatures and/or more or less periods of time can be used when appropriate. Stirring, mixing, and/or agitation can be performed to, e.g., ensure homogeneity. The reaction conditions can include introducing $N_2$, Ar, and/or other non-reactive gases before, during, and/or after reaction of the one or more components. In some examples, the reaction conditions include an operating temperature that is higher than, less than, or equal to the operating temperature of the introduction conditions.

After a suitable time, the reaction product mixture comprising the bimetallic structure can be subjected to filtration, separation, cleaning, quenching, washing, purification, and/or other suitable processes to remove undesired components and isolate the bimetallic structure from the other components of the reaction product mixture. For example, the reaction product mixture comprising the bimetallic structure can be centrifuged to separate the bimetallic structure (which may be in the form of particles) from the reaction product mixture. Additionally, or alternatively, the bimetallic structure can be washed with polar solvent(s), such as water, acetone, ethanol, methanol, or combinations thereof, and/or non-polar solvent(s), such as hexane, pentane, toluene, or combinations thereof. Other solvents for washing can include ether solvents such as diethyl ether and tetrahydrofuran; chlorocarbon solvents such as dichloromethane and chloroform; as well as ethyl acetate, dimethylformamide, acetonitrile, benzene, isopropanol, n-butanol, n-propanol. Mixtures of two or more of these solvents, in suitable proportions, can be utilized for washing, purifying, or otherwise separating the bimetallic structure from other components in the reaction product mixture. As an example, a solvent or mixture of solvents can be added to the bimetallic structure and the resultant mixture centrifuged. The supernatant can be discarded and the remaining pellet can be dispersed in a suitable solvent or mixture of solvents. The resultant pellet and solvent(s) can then be centrifuged to obtain the bimetallic structure.

As a non-limiting example of the first operation, an alkylphosphine with or without a nitrogen-containing compound, such as OLA, can be degassed using a non-reactive gas while agitating. The alkylphosphine with or without a nitrogen-containing compound can be heated to a temperature of about 275° C. to about 350° C. A copper amine is then added to the alkylphosphine and agitated. The resultant mixture containing the copper amine and the alkylphosphine is then set to introduction conditions such as an introduction temperature from about 100° C. to about 140° C., stirred for a suitable period of time, under suitable pressures, with or without the presence of a non-reactive gas. A Group 8-11 metal amine, with or without a nitrogen-containing compound, is then added to the mixture at this introduction temperature and stirred under the introduction conditions for a suitable period of time, under suitable pressures, with or without the presence of a non-reactive gas. At a selected time point, the mixture of the Group 8-11 metal amine, alkylphosphine, and copper amine are placed under the reaction conditions. The reaction conditions can be the same or different conditions as the introduction conditions. In this example, the reaction conditions can include heating the mixture of the Group 8-11 metal amine, alkylphosphine, copper amine, and optional nitrogen-containing compound(s) (as solvent(s)), at a temperature from about 225° C. to about 275° C. for a suitable period of time, under suitable pressures, and with or without the presence of a non-reactive gas, to form the bimetallic structure. The bimetallic structure can then be subjected to filtration, separation, cleaning, quenching, washing, purification, and/or other suitable processes to remove undesired components and/or isolate the bimetallic structure from the other components of the reaction mixture.

Formation of the trimetallic nanoparticles further includes a second operation. The second operation includes introducing a Pt-containing precursor (for example, a Pt metal complex) with the bimetallic structure to form a trimetallic structure. The Pt metal complex can be formed from a platinum source and a nitrogen-containing compound. The nitrogen-containing compound can be those described above, though other nitrogen-containing compounds are contemplated. Conditions to form the Pt metal complex, molar ratios of starting materials, and other parameters can be the same as those described above. The Pt metal source can include platinum halides, platinum acetates, platinum nitrates, and/or other suitable platinum species. Hydrates are also contemplated. Examples of Pt metal source can include, but are not limited to, hexachloroplatinic acid (or hydrates thereof, for example, $H_2PtCl_6 \cdot 6H_2O$), platinum chloride ($PtCl_4$), potassium platinum(II) chloride ($K_2PtCl_4$), platinum(II) acetate ($Pt(CH_3CO_2)_2$), platinum(IV) acetate ($Pt(CH_3CO_2)_4$), sodium hexachloroplatinate hexahydrate ($Na_2PtCl_6 \cdot 6H_2O$), and platinum(II) acetylacetonate ($Pt(C_5H_7O_2)_2$)

Reaction conditions effective to form the trimetallic structure can include a reaction temperature and a reaction time. The reaction temperature can be from about 80° C. to about 340° C., such as from about 90° C. to about 330° C., such as from about 100° C. to about 320° C., such as from about 110° C. to about 310° C., such as from about 120° C. to about 300° C., such as from about 130° C. to about 290° C., such as from about 140° C. to about 280° C., such as from about 150° C. to about 270° C., such as from about 160° C. to about 260° C., such as from about 170° C. to about 250° C., such as from about 180° C. to about 240° C., such as from about 190° C. to about 230° C., such as from about 200° C. to about 220° C. In some aspects, the reaction temperature can be from about 80° C. to about 320° C., such as from about 80° C. to about 150° C. or from about 180° C. to about 320° C., such as from about 200° C. to about 300° C. Higher or lower temperatures can be used when appropriate. The reaction conditions can include a duration of about 5 min or more or about 72 h or less, such as from about 30 min to about 48 h, such as from about 1 h to about 24 h. Higher or lower temperatures and/or more or less periods of time can be used when appropriate. Stirring, mixing, and/or agitation can be performed to, e.g., ensure homogeneity. The reaction conditions can include introducing $N_2$, Ar, and/or other non-reactive gases before, during, and/or after reaction of the one or more components. Any suitable pressure can be used during formation of the trimetallic structure.

In some aspects, the reaction product comprising the trimetallic structure can be subjected to filtration, separation, cleaning, quenching, washing, purification, and/or other suitable processes to remove undesired components and isolate the trimetallic structure from the other components of the reaction mixture. For example, the reaction product comprising the trimetallic structure (which may be in the form of particles) can be centrifuged to separate the trimetallic structure from the mixture. Additionally, or alternatively, the trimetallic structure can be washed with polar solvent(s), such as water, acetone, ethanol, methanol, or combinations thereof, and/or non-polar solvent(s), such as hexane, pentane, toluene, or combinations thereof. Other solvents for washing can include ether solvents such as diethyl ether and tetrahydrofuran; chlorocarbon solvents such as dichloromethane and chloroform; as well as ethyl acetate, dimethylformamide, acetonitrile, benzene, isopropanol, n-butanol, n-propanol. Mixtures of two or more of these solvents, in suitable proportions, can be utilized for washing, purifying, or otherwise separating the trimetallic structure from other components in the reaction mixture. As an example, a solvent or a mixture of solvents can be added to the trimetallic structure and the resultant mixture centrifuged. The supernatant can be discarded and the remaining pellet can be dispersed in a suitable solvent or mixture of solvents. The resultant pellet and solvent(s) can then be centrifuged to obtain the trimetallic structure. In these and other aspects, the pellet comprising the trimetallic structure can be re-solubilized or re-suspended in a suitable solvent such as water or those described above.

If desired, the trimetallic structure can then be etched to form a trimetallic nanoframe that can be used with embodiments described herein. Etching can be performed in the same or a similar manner as described above for the bimetallic nanoparticles.

The trimetallic nanoparticles formed as described above (or different trimetallic nanoparticles) can be utilized for process 100.

The following examples are put forth so as to provide those of ordinary skill in the art with a complete disclosure and description of how to make and use aspects of the present disclosure, and are not intended to limit the scope of aspects of the present disclosure. Efforts have been made to ensure accuracy with respect to numbers used (such as the amounts, dimensions) but some experimental errors and deviations should be accounted for.

EXAMPLES

Various example, but non-limiting, metal catalysts (metal nanoparticles) according to some aspects described herein were prepared. An example synthesis of bimetallic metal nanoparticles is described in Example 2 and an example synthesis of trimetallic nanoparticles is described in Example 3. The bimetallic nanoparticles and the trimetallic particles were used for the example electrochemical treatment described in Example 1. Relative to catalyst nanoparticles that are not subjected to processes described herein, the resultant catalyst nanoparticles or nanocrystals can have new reactive crystalline facets, increased durability, increased mass activity, reduced overpotential, increased voltage efficiency, or combinations thereof, among other differences. That is, the electrochemical treatment described herein improves the overall performance and stability of these catalysts, making them more suitable for large-scale fuel cell applications.

Example 1: Example Electrochemical Treatment and Measurements

PtNi and PtNiCu nanoparticles were synthesized as described below. Perchloric Acid (70%, Sigma Aldrich), Vulcan XC-72 carbon black, commercial Pt/C (20% wt, Alfa Aesar), and Milli-Q water were purchased. All chemicals were used as received.

Electrochemical measurements were measured on an electrochemical workstation at room temperature (25° C.), using a three-electrode electrochemical setup with a rotating disk electrode (RDE) system. A glassy carbon working electrode (GCE, disk electrode of 5 mm inner diameter, 0.196 cm$^2$), a graphite rod counter electrode, and a silver-silver chloride (Ag/AgCl/saturated KCl) reference electrode were used for all the tests. All potentials in this work are quoted with respect to a reversible hydrogen electrode (RHE). The potential at the zero current point was chosen as the reaction potential of the hydrogen electrode. The potential at the zero current point was determined to be −0.258 V, so the potential measured with an Ag/AgCl electrode can be related by E (RHE)=E(Ag/AgCl)+0.258 V.

The catalysts (metal nanoparticles) utilized for the experiments were bimetallic nanoparticles (PtNi) and trimetallic nanoparticles (PtNiCu).

1(a). Catalyst Modified Electrode Preparation. Catalyst (metal nanoparticles) were loaded on a carbon support (Vulcan XC-72R) to provide a dispersion. A commercial platinum on carbon catalyst (Pt/C, 20 wt %, Sigma-Aldrich) was also used for certain examples. The electrode was prepared as follows. First, a catalyst ink was prepared by ultrasonicating a mixture of about 4 mg catalyst (the metal nanoparticles; Pt loading was about 4 µg), about 1.6 mL water, about 0.4 mL isopropanol, and about 20 µL Nafion™ solution (5 wt %, Sigma-Aldrich) for about 30 minutes to obtain a catalyst ink slurry. About 10 µL of the catalyst ink slurry was spread onto the disk electrode surface (GCE) surface using a micropipette, followed by drying under ambient conditions with a rotation speed of about 700 rpm. Thus, a working electrode was produced. Loading for all the catalyst samples was kept at about 100 µg cm$^{-2}$. The catalysts formed by 1(a) included PtNi/C and PtNiCu/C.

1(b). Catalyst Activation. The working electrode, counter electrode, and reference electrode were immersed in an electrolyte solution (argon-saturated 0.1 M HClO$_4$). The catalyst-modified electrodes were then activated by performing cyclic voltammetry (CV) with the parameters shown in Table 1-1. Two different initial and final potentials were tested (shown in Table 1-1 as Examples 1 and 2). Operation 1(b) can correspond to operation 110 of process 100.

TABLE 1-1

|  | Example 1 | Example 2 |
| --- | --- | --- |
| Number of cycles | 30-35 | 30-35 |
| Initial potential | 0 V vs. RHE | 0.024 V vs. RHE |

TABLE 1-1-continued

|  | Example 1 | Example 2 |
| --- | --- | --- |
| Final potential | 1.05 V vs. RHE | 1.1 V vs. RHE |
| Scan rate (sweep rate) | 50 mV/s | 50 mV/s |

The activation cleans the surface of the catalyst metal nanoparticles, removes physically adsorbed molecules from the surface, and exposes the active sites of the catalyst metal nanoparticles exposed to the electrolyte solution.

1(c). High Voltage Cyclic Voltammetry Surface Cleaning. Following 1(b), the surfaces of the catalyst-modified electrodes were then cleaned by immersing the electrodes in an electrolyte solution (argon-saturated 0.1 M HClO$_4$) and performing CV with the parameters shown in Table 1-2. Four different initial and final potentials were tested (shown in Table 1-2 as Examples 3-6). Operation 1(c) can correspond to operation 120 of process 100.

TABLE 1-2

|  | Example 3 | Example 4 | Example 5 | Example 6 |
| --- | --- | --- | --- | --- |
| Number of cycles | 35 | 35 | 35 | 35 |
| Initial potential, V vs. RHE | 0 | 0.025 | 0.025 | 0.025 |
| Final potential, V vs. RHE | 1.05 | 1.1 | 1.3 | 1.5 V |
| Scan rate (sweep rate), mV/s | 50 | 50 | 50 | 50 |

Transmission electron microscopy (TEM) imaging and high-resolution transmission electron microscopy (HR-TEM) imaging were performed to compare an "initial electrode" and a "final electrode". Both initial and final electrodes comprise PtNiCu nanoparticles. After fabricating the electrodes according to operation 1(a), the initial electrode was not subjected to aspects described herein (e.g., not subjected to operations 1(b) and 1(c)). The final electrode was subjected to aspects described herein (e.g., subjected to operations 1(b) and 1(c)). That is, the initial electrode represents the electrode prior to performing processes described herein and the final electrode represents the electrode after performing processes described herein.

FIGS. 2A and 2B show a TEM image and a HR-TEM image of the initial electrode, respectively. FIGS. 2C and 2D show a TEM image and a HR-TEM image of the final electrode, respectively. In FIGS. 2B and 2D, numeral 201 refers to an edge and numeral 203 refers to a pore. As shown by the images, the activation (operation 1(b)) and high-voltage treatment (operation 1(c)) results in, for example, more hollow nanoparticles due to dissolution of nickel or copper. The nanoparticles' surface segregation and re-construction as a result of processes described herein can produce various defects on the surface of catalysts surface, which will improve catalyst' activity. The various defects in the surface morphology can include kinks, terraces, boundaries, ledges, terrace-ledges, adatoms, adatom clusters, advacancies, and advacancy clusters, among other defects.

Referring back to the CV experiments, the CV curves were first obtained to examine the electro-chemically active surface area (ECSA). Because CV reflects surface structure changes, the CV can be utilized to judge the surface structure reconstruction in addition to its use in the electrochemical treatment operations of operation 1(b) and 1(c).

Electrodes having bimetallic nanoparticles (PtNi/C) or trimetallic nanoparticles (PtNiCu/C) fabricated by operation 1(a) were subjected to operations 1(b) and 1(c). A control electrode having bimetallic nanoparticles (PtNi/C) was also fabricated by operation 1(a) and was subjected to operation 1(b) but was not subjected to the high-voltage treatment operation 1(c). The control is referred to as "short-range CV PtNi/C".

Figure 3A:
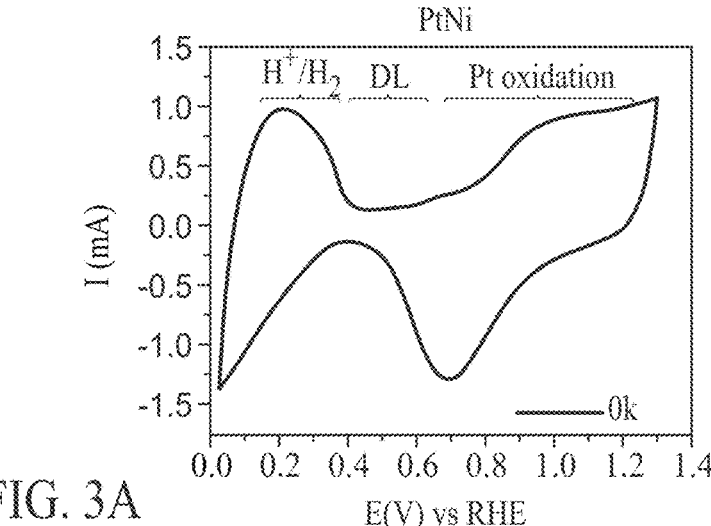
FIGS. 3A-3C show example cyclic voltammetry (CV) curves of the initial states of example catalyst nanoparticles.
Figure 3B:
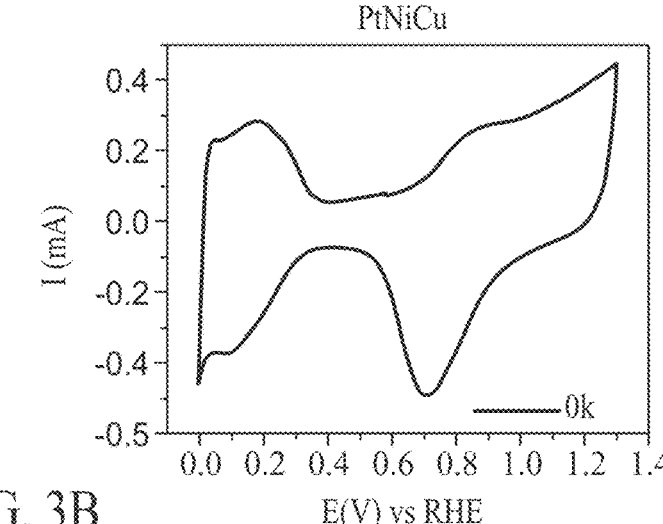
Figure 3C:
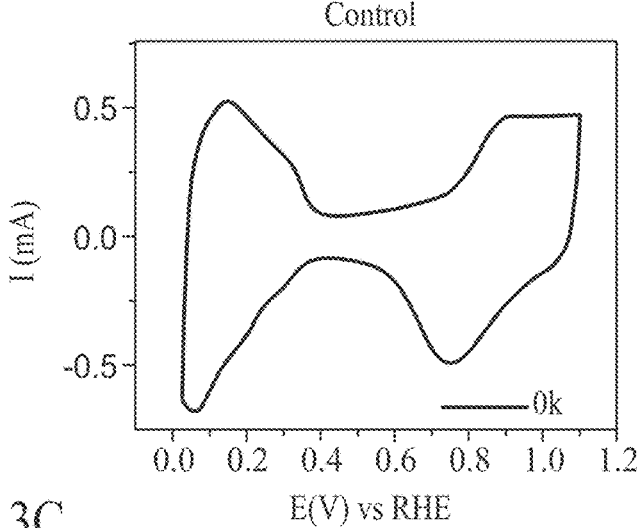

Two and a half cycles of CV were recorded to obtain reproducible cycles. The initial CV curve (OK cycles) shown in FIGS. 3A-3C of each experiment show an H+/H$_2$ area double layer (DL) charge area and Pt oxidation area, as reported in literature. Specifically, the initial states (Ok cycles) before the durability test and oxidation cycles of electrodes comprising PtNi/C nanoparticles or PtNiCu/C nanoparticles are shown in FIGS. 3A and 3B, respectively. FIG. 3C shows the initial state of short-range CV PtNi/C nanoparticles before the durability test and oxidation cycles.

Figure 4A:
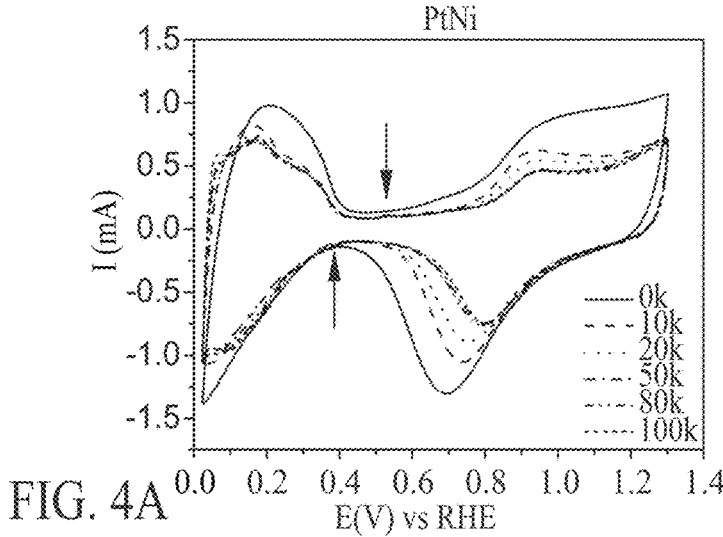
FIGS. 4A-4C show example CV curves of the example catalyst nanoparticles after submitting the example catalyst nanoparticles to processes described herein.
Figure 4B:
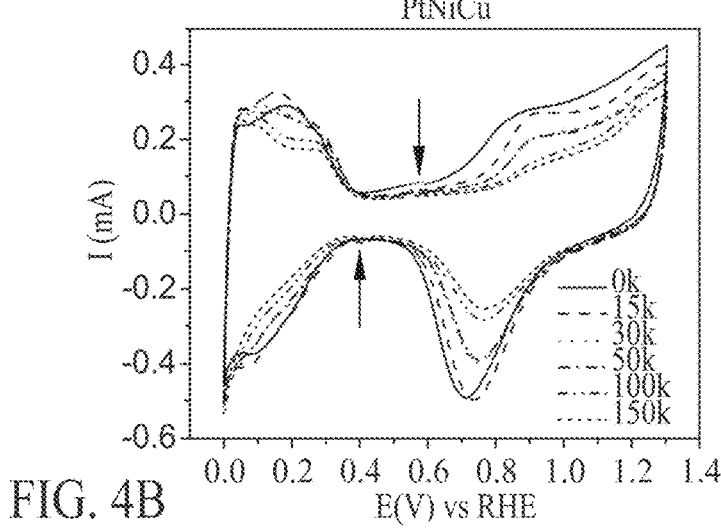
Figure 4C:
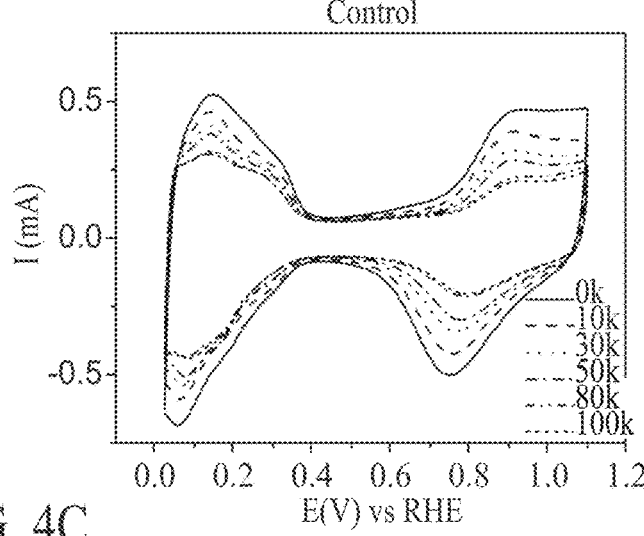

After each designed durability test, CV curves were collected after selected numbers of cycles and results are shown in FIGS. 4A-4C. Specifically, FIGS. 4A and 4B show CV curves after the durability test and oxidation cycles of PtNi/C and PtNiCu/C after a selected number of cycles, respectively. FIG. 4C shows CV curves after the durability test and oxidation cycles of the short-range CV PtNi/C (control) after a selected number of cycles. The electrode comprising the PtNi/C nanoparticles were subjected to CV treatments of 0 cycles (0 k, initial state), 10,000 cycles, 20,000 cycles, 50,000 cycles, 80,000 cycles, and 100,000 cycles, and CV curves were collected. The electrode comprising the PtNiCu/C nanoparticles were subjected to CV treatments of 0 cycles (0 k, initial state), 15,000 cycles, 30,000 cycles, 50,000 cycles, 100,000 cycles, and 150,000 cycles, and CV curves were collected. The control electrode (FIG. 4C) was subjected to CV treatments of 0 cycles (0 k, initial state), 10,000 cycles, 30,000 cycles, 50,000 cycles, 80,000 cycles, and 100,000 cycles, and CV curves were collected.

As shown in FIGS. 4A and 4B, there are small peaks newly formed in the double-layer charge area (indicated by the arrows) when the electrodes were oxidized at about 1.3 V in CV, while no peaks were observed in the double-layer charge area for the control (FIG. 4C). The peaks in the double-layer charging area in FIGS. 4A and 4B indicates that new surface structures are formed by processes described herein, and can be associated with the surface structure reconstruction that is closely related to ORR performance. To the inventors' knowledge, this result has never been reported. In addition, and relative to the CV curves of the control, the electrodes comprising the PtNi/C nanoparticles and the PtNiCu/C nanoparticles show significantly improved durability. Overall, the data indicates that the high-voltage oxidation (for example, +1.3 to +1.5 V) treatment described herein can serve to, for example, freshen the catalyst surfaces that become inert in long-term durability tests by forming new reactive crystalline facets.

ORR polarization curves (linear sweep voltammetry) were also collected. ORR polarization curves display the voltage output of a fuel cell for a given current density loading. The ORR polarization curves were recorded in an O$_2$-saturated 0.1 M HClO$_4$ electrolyte at a rotation speed of 1600 rpm and a scan rate of 10 mV/s. After each designed durability test, ORR polarization curves were re-measured in the same conditions as the initial ones (including the same pressure, temperature, electrolyte and other parameters as the initial measurement). Results are shown in FIGS. 5A-5C.

Figure 5A:
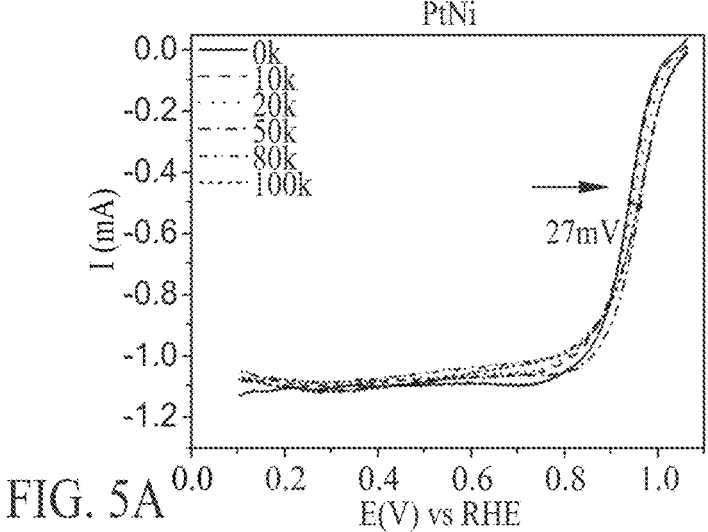
FIGS. 5A-5C show example oxidation reduction reaction (ORR) polarization curves of example catalyst nanoparticles after submitting the example catalyst nanoparticles to processes described herein.
Figure 5B:
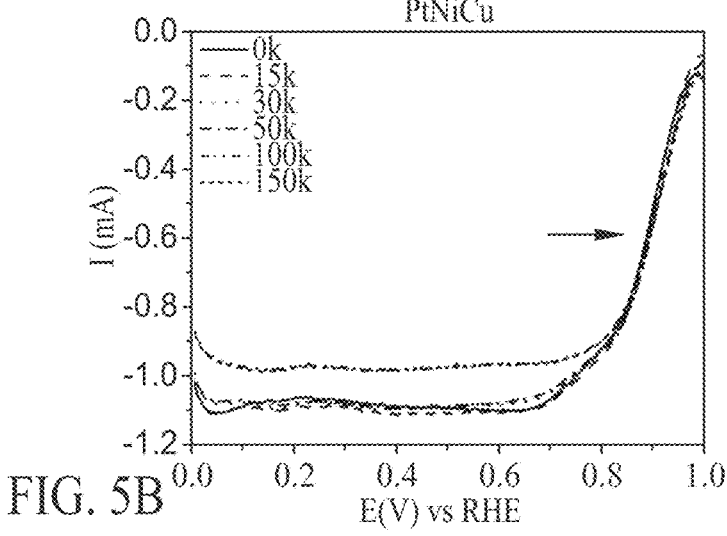
Figure 5C:
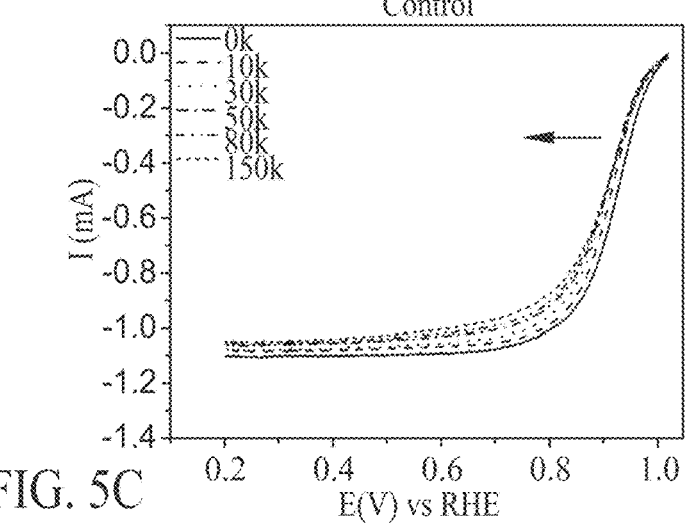

As shown in FIGS. 5A and 5B, the high voltage oxidation results in an unexpected enhancement in terms of kinetic current and overpotentials after durability tests. The results are unexpected because performance typically worsens relative to the initial electrode in terms of, for example, overpotential and kinetic current. That is conventional technologies (such as Pt/C or others) would show worse performance. However, aspects described herein show that performance is enhanced relative to the initial electrode.

Here, for example, the ORR polarization curves of the high-voltage treated electrode comprising PtNi/C nanoparticles shifted to the right even after 100,000 cycles by about 27 mV relative to the initial electrode (FIG. 5A). As another example, the ORR polarization curves of the treated electrode comprising PtNiCu/C nanoparticles shifted to the right even after 150,000 cycles (FIG. 5B). The small peaks show a positive correlation with the reduction of overpotentials. In contrast, and as shown in FIG. 5C, the ORR polarization curves of the control electrode (without high-voltage treatment operation 1(c)) shifted leftward, as would be expected when performing multiple cycles.

The durability testing was performed in an Ar-saturated 0.1 M HClO$_4$ solution at room temperature in the voltage range of 0.6-1.0 V at a scan rate of 200 mV/s.

Figure 6:
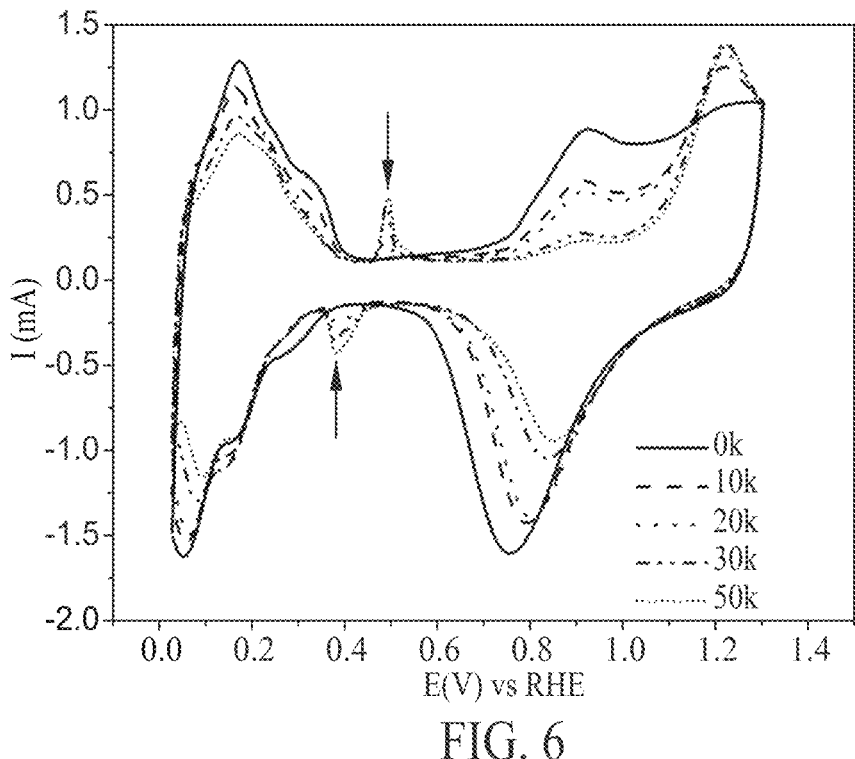
FIG. 6 shows example CV curves of example catalyst nanoparticles after submitting the example catalyst nanoparticles to processes described herein.

To speed up the formation a new active surface structures, the experiments were conducted at a temperature of about 40° C. CV curves of the high-voltage treated (at 40° C.) electrode comprising PtNi/C nanoparticles are shown in FIG. 6. The data in FIG. 6 shows newly formed, very sharp peaks in the double-layer charge area at 40° C. rapidly emerging to consolidate the new active surface structures formed by the high-voltage treatment operation 1(c). The appearance of the peaks in the double layer range is associated with the newly formed surface structures as described above.

Figure 7:
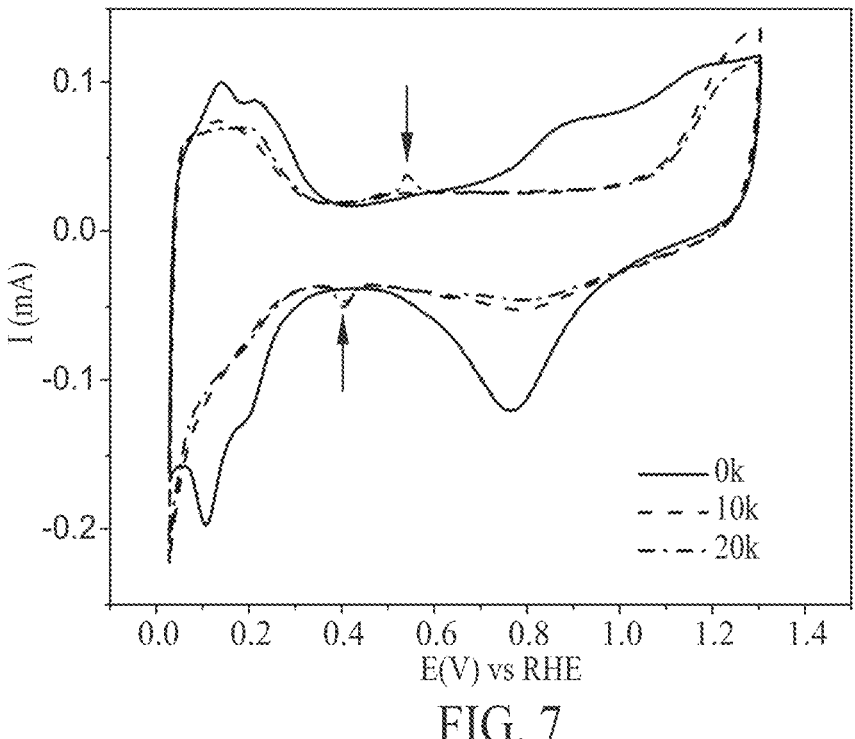
FIG. 7 shows example CV curves of Pt/C after submitting it to processes described herein.

In addition to the PtNi/C and PtNiCu/C catalysts, an electrode comprising commercial Pt/C catalyst nanoparticles was fabricated by operation 1(a) and subjected to operations 1(b) and 1(c). FIG. 7 shows CV curves of the high-voltage treated electrode comprising Pt/C nanoparticles after the durability test and oxidation cycles. The data in FIG. 7 indicates that new surface structures can be formed by processes described herein as shown by the peaks in the double-layer charging area.

Overall, the long-range high oxidation voltage CV treatment as described herein can be utilized to activate metal catalysts (metal nanoparticles) and construct new surface structures. As a result, the performance of PtNi and PtNiCu on ORR can be enhanced, showing higher kinetic currents and lower overpotentials with durability cycles. To the inventors' knowledge, this is the first time to reveal a facile method to improve the durability of catalysts on ORR up to 300,000 cycles.

Aspects described herein enable formation of binary and trinary catalyst nanoparticles (for example, PtNi, PtNiCu). The pre-treatment procedure can include, for example, carbon loading and surface activation. The treatment procedure can include a unique electrochemical treatment operation that involves the application of a relatively high voltage (for example, at about +1.3 V) or more during cyclic voltammetry (CV) measurements. This electrochemical treatment can reconstruct the surface atomic arrays of the catalyst nanoparticles, resulting in the formation of more active surface facets. While conventional CV treatments only utilize voltages lower than 1.1 V to prevent catalyst destruction, processes described herein demonstrates that higher voltage treatments can actually improve catalyst performance and durability. As a result, the mass activities and electrochemically active surface area of the catalysts can even slightly increase after certain durability cycles. To the inventors' knowledge, this is the first report of using electrochemical treatments to enhance the catalytic performance of, for example, PtNi and PtNiCu catalysts in cathodic fuel cell reactions. Aspects described herein can provide a simple and effective way to improve the long-term performance of catalysts in fuel cell applications, addressing the challenges of durability and activity that have thus far limited the widespread adoption of these materials.

Example 2: Synthesis of Bimetallic Nanoparticles

Oleylamine (OLA, 70%), hexadecylamine (90%, HDA), octadecylamine (95%, ODA), nickel acetylacetonate (Ni (acac)$_2$), nickel nitrate (Ni(NO$_3$)$_2$), nickel chloride (NiCl$_2$), hexachloroplatinic acid hexahydrate (H$_2$PtCl$_6$·6H$_2$O), sodium hexachloroplatinate hexahydrate (Na$_2$PtCl$_6$·6H$_2$O), platinum chloride (PtCl$_4$), platinum acetylacetonate (Pt (C$_5$H$_7$O$_2$)$_2$), toluene (99.9%), acetone (99%), and chloroform (99.9%), 1-octadecene (ODE, 98%) were purchased from Sigma-Aldrich. Acetic acid (CH$_3$COOH) were purchased from Alfa Aesar. Tetradecylamine (TDA, >96%) was purchased from TCI. Hexane (99%), methanol (99%), and ethanol (200 proof) were purchase from Fisher Chemicals. All chemicals were used as received.

Ex. 2A. Synthesis of Nickel-OLA (Ni-OLA) Precursor Stock Solution

Ni(acac)$_2$ (about 128 mg, about 0.5 mmol) and OLA (about 4 mL) were mixed in a flask under an Ar or N$_2$ environment to form a solution/suspension. The solution/suspension was then heated at about 50-150° C. and shaken for about 5 minutes. The solution/suspension was then cooled to about room temperature. This Ni-OLA solution/suspension was utilized as a Ni-OLA precursor stock solution. Similar precursor stock solutions can be prepared using, for example, nickel nitrate, nickel chloride, among other nickel salts. Various other amines can also be utilized such as TDA, HDA, ODA, among other amines. Larger or smaller amounts of each are also contemplated.

Ex. 2B. Synthesis of Platinum-OLA (Pt-OLA) Precursor Stock Solution

H$_2$PtCl$_6$·6H$_2$O (about 0.1 mmol, 51.7 mg) and OLA (about 3 mL) were mixed in a flask under an Ar or N$_2$ environment to form a solution/suspension. The solution/suspension was then heated at about 50-150° C. and shaken for about 5 minutes. The solution/suspension was then cooled to about room temperature. This Pt-OLA solution/suspension was utilized as a Pt-OLA precursor stock solution.

Similar precursor stock solutions can be prepared using other platinum materials as well as other amines such as, for example, TDA, HDA, ODA, among other amines. Larger or smaller amounts of each are also contemplated.

Ex. 2C. Synthesis of Platinum-Nickel (PtNi) Polyhedral Nanoparticles (NPs)

H$_2$PtCl$_6$·6H$_2$O (about 0.1 mmol, about 51.7 mg) and HDA (about 40 mmol, about 10.0 g) were loaded into a 50 mL three-neck flask equipped with a magnetic stir bar to form a reaction mixture. Argon gas was flown into the flask for about 20 min to remove O$_2$ from the system. The reaction mixture was heated to about 200° C. with stirring, the reaction mixture quickly turned gray, and Ni-OLA precursor stock solution (about 3 mL) was injected into the reaction mixture. After about 20 min at 200° C. with stirring, the reaction mixture was cooled to about 80° C. At this point, about 5 mL of hexane (or another hydrophobic solvent such as toluene and/or chloroform) and 5 mL of ethanol were added and the mixture was centrifuged at about 3,000 rpm for about 2 min to remove excess reactants and excess amine. The supernatant was discarded. About 10 mL of hexane was then added to the sediment, and the mixture was centrifuged at about 4,000 rpm for about 5 min. The washing procedure was repeated twice to remove unreacted precursors and excess amine. The PtNi polyhedral NPs were stored in a hydrophobic solvent (for example, hexane, toluene, and/or chloroform).

Various temperatures at which the injection of the Ni-OLA precursor were tested and can vary from, for example, about 80° C. to about 210° C., though other temperatures are contemplated. Other platinum materials can be utilized as well as other amines such as, for example, TDA, ODA, OLA, among other amines. Larger or smaller amounts of each are also contemplated.

Ex. 2D. Example Platinum Ion Treatment of PtNi Polyhedral NPs

PtNi polyhedral NPs (about 20 mg), 1-octadecene (ODE, about 6 mL), and OLA (about 2 mL) were loaded into a 50 mL flask equipped with a magnetic stir bar to form a reaction mixture. Argon gas was flown into the flask for about 20 min to remove O$_2$ from the system. The reaction mixture was heated to about 80° C. with stirring, at which point Pt-OLA precursor stock solution (about 3 mL) was injected into the flask under argon gas flow. The reaction mixture was then heated to about 200° C. and kept at this temperature for about 60 min with stirring. The reaction mixture was then cooled to about room temperature. At this point, about 5 mL of hexane (or another hydrophobic solvent such as toluene and/or chloroform) and 5 mL of ethanol were added and the mixture was centrifuged at about 3,000 rpm for about 2 min to remove excess reactants and excess amine. The supernatant was discarded. About 10 mL of hexane was then added to the sediment, and the mixture was centrifuged at about 4,000 rpm for about 5 min. The washing procedure was repeated twice to remove unreacted precursors and excess amine. The Pt ion treated PtNi polyhedral NPs were stored in a hydrophobic solvent (for example, hexane, toluene, and/or chloroform).

Various temperatures at which the injection of the Pt-OLA precursor and resultant reaction mixture after injection were tested and can vary from, for example, about 80° C. to about 300° C., though other temperatures are contemplated. The reaction time after injection of Pt-OLA precursor can also vary from about 5 min to about 5 hours, though other durations are contemplated. Other amines such as, for example, HDA, ODA, TDA, among other amines can be utilized. Solvents other than ODE can be utilized additionally, or alternatively, such as diphenyl ether and biphenyl, among other solvents. Larger or smaller amounts of the materials are also contemplated.

Ex. 2E. Acid Treatment of Pt Ion Treated PtNi Polyhedral NPs

Pt ion treated PtNi polyhedral NPs (about 20 mg), acetic acid (about 2 mL), and water (about 2-10 mL) were loaded into a 25 mL flask equipped with a magnetic stir bar to form a reaction mixture. Argon gas was flown into the flask for about 20 min to remove O$_2$ from the system. The reaction mixture was stirred at about room temperature for about 48 hours. The reaction mixture was then centrifuged at about 3,000 rpm for about 2 min to remove unreacted materials and excess acid. The supernatant was discarded. About 5 mL of DI water was then added to the sediment, and the mixture was centrifuged at about 4,000 rpm for about 5 min. The washing procedure was repeated twice to remove unreacted precursors and excess acid. The resultant PtNi hollow polyhedral NPs (or nanoframes) were stored in a hydrophilic solvent (for example, methanol, ethanol, and/or acetone).

Other acids can be used in addition to, or as an alternative to, acetic acid, such as phosphoric acid, carbonic acid, sulfuric acid, and/or perchloric acid. Other solvents can be used in addition to, or as an alternative to, DI water, such as methanol, ethanol, and/or acetone. Reaction temperatures may also vary from about 20° C. to about 60° C., though other temperatures are contemplated. Reaction time may also vary from about 1 min to about 168 hours, though other durations are contemplated.

The bimetallic nanoparticles formed can be used with aspects of electrochemical processes described herein as described above.

Example 3: Synthesis of Trimetallic Nanoparticles

Ex. 3A. Synthesis of Copper-TDA (Cu-TDA)

Copper (I) chloride (100 mg, 1 mmol), TDA (240 mg), and ODE (2 mL) were mixed in a flask under an Ar or $N_2$ environment to form a solution/suspension. After degassing for 20 minutes, the solution/suspension was heated to 200° C. under Ar and/or $N_2$. After keeping the solution/suspension at this temperature for 10 minutes, the solution/suspension was cooled to room temperature. This Cu-TDA solution/suspension was utilized as a Cu-TDA precursor stock solution.

Various parameters were also investigated. Similar precursor stock solutions were investigated and can be prepared using other copper materials such as copper acetate or copper nitrate, among other copper materials, as well as other amines such as, for example, OLA, HDA, ODA, among other amines. Larger or smaller amounts were investigated. For example, amounts of copper materials were investigated and can vary from, at least, the range of 0.05 mmol to 10 mmol with the amounts of amine (for example, TDA or others) varied accordingly.

Ex. 3B. Synthesis of Copper Nickel (Cu—Ni) Polyhedral Nanoparticles (NPs)

OLA (70%, 6 mL) was added to a 50 mL three-neck flask and the flask was fixed to a vertical gas flow column. Oxygen was removed by Ar or $N_2$ blowing for 20 min. After degassing, TOP (1 mL) was injected into the three-neck flask under an Ar or $N_2$ environment. After degassing for 20 minutes, the mixture was rapidly heated to about 300° C. under Ar and/or $N_2$. Next, Cu-TDA precursor stock solution (0.5 mol/L, 2 mL) as injected into the three-neck flask, and the reaction solution was mixed until a bright red color was observed. The reaction solution was then cooled to a temperature of 120° C. and then 4 mL of the Ni-OLA stock solution (Ex. 1B) was injected, and the reaction solution was maintained at 120° C. After about 1 hour at 120° C., the reaction solution was heated to 250° C. After about 3 minutes at 250° C., the heating mantle was turned off and the reaction solution was cooled to room temperature. Hexane (5 mL (or other hydrophobic solvent such as toluene and chloroform) and ethanol (5 mL) were added into the three-neck flask. The resulting Cu—Ni polyhedral nanoparticles were isolated by centrifuging at 4000 rpm for 5 minutes, and the supernatant was discarded. Another amount of hexane (about 10 mL) and ethanol (10 mL) were then added to the pellet and the mixture was centrifuged at about 4000 rpm for 5 minutes. The Cu—Ni polyhedral NPs were stored in a hydrophobic solvent (e.g., hexane, toluene, and/or chloroform) before further use and/or characterization.

Various parameters were also investigated. For example, the temperature at which the Ni precursor was injected can range from, at least, 200° C. to 300° C. After the injections, the reaction solution can be stirred at a temperature from, at least, 100° C. to 220° C. for an hour. The temperature can then be heated at 250° C. Different Ni stock solution were also investigated. For example, Ni-OLA stock solutions can be made from nickel nitrate or nickel chloride. Tributylphosphine (TBP) was also investigated and can be used instead of TOP.

Ex. 3C. Synthesis of Pt—Cu—Ni Polyhedral Nanoparticles (NPs)

Cu—Ni polyhedral NPs (about 30-50 mg) were dried using an inert gas (for example, argon or $N_2$) and transferred to a 50 mL three-neck flask and the flask was fixed to a vertical gas flow column. Oxygen was removed by Ar or $N_2$ blowing for 20 min. ODE (6 mL) and OLA (3 mL) were added. Pt-OLA precursor stock solution (0.06 mmol/L, 3 mL) was injected to the reaction mixture at 80° C. and the reaction temperature was raised to a reaction temperature of 200° C. After 1 hour of reaction time at 200° C., the reaction was stopped and the reaction solution was cooled to room temperature. Hexane (5 mL (or other hydrophobic solvent such as toluene and chloroform) and ethanol (5 mL) were added into the three-neck flask. The resulting Pt—Cu—Ni polyhedral nanoparticles were isolated by centrifuging at 4000 rpm for 5 minutes, and the supernatant was discarded. Another amount of hexane (about 10 mL) and ethanol (10 mL) were then added to the pellet and the mixture was centrifuged at about 4000 rpm for 5 minutes. The Pt—Cu—Ni polyhedral NPs were stored in a hydrophobic solvent (e.g., hexane, toluene, and/or chloroform) before further use and/or characterization.

Various parameters were also investigated. For example, various concentrations of the Pt precursor stock solution were tested and can be varied in the range of, at least, 0.01 mmol to 10 mmol/L. Different reaction times were tested and can vary from, at least, 5 minutes to 72 hours. Different reaction temperatures were tested and can vary from, at least, 80° C. to 300° C. Different volumes of ODE were tested and can vary from, at least, 0.5 mL to 1 L. Different volumes of OLA were tested and can vary from, at least, 0.5 mL to 1 L. Amounts of Cu—Ni polyhedral NPs were tested and can be varied from, at least, 1 mg to 1 kg.

The trimetallic nanoparticles can be used with aspects of electrochemical processes described herein as described above.

ASPECTS LISTING

The present disclosure provides, among others, the following aspects, each of which can be considered as optionally including any alternate aspects:

Clause A1. A process for making an electrode comprising carbon-supported metal alloy nanoparticles, the process comprising:

applying a plurality of first voltage cycles from about 0 V to about +1.1 V to an initial electrode, the initial electrode comprising:

metal alloy nanoparticles comprising platinum and one or more Group 8-11 metals, the one or more Group 8-11 metals free of Pt; and a carbon source; and then applying a plurality of second voltage cycles from an initial potential ranging from about −0.2 V to about 0 V to a final potential of at least +1.2 V to form a final electrode, the metal alloy nanoparticles of the final electrode having an oxygen reduction reaction (ORR) mass activity that is greater than the ORR mass activity of the initial electrode.

Clause A2. The process of Clause A1, wherein the ORR mass activity of the final electrode is about 20% or more than the ORR mass activity of the initial electrode.

Clause A3. The process of Clause A1 or Clause A2, wherein the plurality of first voltage cycles comprises:

from about 10 to about 50 first voltage cycles; and each first voltage cycle comprises:

increasing the voltage from about 0 V to about +1.1 V at a scan rate of about 10 mV/s to about 500 mV/s; and decreasing the voltage from about +1.1 V to about 0 V at a scan rate of about 10 mV/s to about 500 mV/s.

Clause A4. The process of any one of Clauses A1-A3, wherein the plurality of second voltage cycles comprises:

from about 20 to about 150 second voltage cycles; and each second voltage cycle comprises:

increasing the voltage from an initial potential ranging from about −0.2 V to about 0 V to a final potential ranging from about +1.2 to about +1.5 V at a scan rate of about 10 mV/s to about 500 mV/s; and decreasing the voltage from the initial potential to the final potential at a scan rate of about 10 mV/s to about 500 mV/s.

Clause A5. The process of any one of Clauses A1-A4, wherein each second voltage cycle comprises:

increasing the voltage from an initial potential ranging from about −0.2 V to about 0 V to a final potential ranging from about +1.2 to about +1.3 V at a scan rate of about 10 mV/s to about 500 mV/s; and decreasing the voltage from the initial potential to the final potential at a scan rate of about 10 mV/s to about 500 mV/s.

Clause A6. The process of any one of Clauses A1-A5, wherein the one or more Group 8-11 metals comprises Fe, Ru, Os, Co, Rh, Ir, Ni, Pd, Cu, Ag, Au, or combinations thereof.

Clause A7. The process of any one of Clauses A1-A6, wherein the one or more Group 8-11 metals comprises Co, Ni, Fe, Cu, or combinations thereof.

Clause A8. The process of any one of Clauses A1-A7, wherein:

an amount of metal alloy nanoparticles present in the initial electrode is from about 10 wt % to about 80 wt % based on a total amount of the metal alloy nanoparticles and the carbon source, the total amount not to exceed 100 wt %; and an amount of carbon source present in the initial electrode is from about 20 wt % to about 90 wt % based on the total amount of the metal alloy nanoparticles and the carbon source.

Clause A9. The process of any one of Clauses A1-A8, wherein:

an amount of metal alloy nanoparticles present in the initial electrode is from about 20 wt % to about 60 wt % based on a total amount of the metal alloy nanoparticles and the carbon source, the total amount not to exceed 100 wt %; and an amount of carbon source present in the initial electrode is from about 40 wt % to about 80 wt % based on the total amount of the metal alloy nanoparticles and the carbon source.

Clause A10. The process of any one of Clauses A1-A9, wherein the metal alloy nanoparticles comprises Pt and Cu.

Clause A11. The process of Clause A10, wherein the metal alloy nanoparticles further comprises Ni.

Clause B1. A process for improving an oxygen reduction reaction (ORR) mass activity of a carbon supported catalyst, the process comprising:

exposing an initial electrode comprising a carbon supported catalyst to a plurality of first voltage cycles comprising:

(a) ramping the voltage from about 0 V to about +1.1 V;

(b) ramping the voltage from about +1.1 V to about 0 V; and (c) repeating (a) and (b) at least 10 times; and then exposing the resultant electrode to a plurality of second voltage cycles to form a final electrode, comprising:

(d) ramping the voltage from an initial potential ranging from about −0.2 V to about 0 V to a final potential ranging from about +1.2 V to about +1.5 V;

(e) ramping the voltage from the final potential to the initial potential; and (f) repeating (d) and (e) at least 20 times, wherein the carbon supported catalyst comprises metal alloy nanoparticles and a carbon source, the metal alloy nanoparticles comprising Pt and one or more Group 8-11 metals, the one or more Group 8-11 metals free of Pt; and wherein the final electrode has an oxygen reduction reaction mass activity that is at least 20% more than the ORR mass activity of the initial electrode.

Clause B2. The process of Clause B1, wherein the final potential of the plurality of second voltage cycles is from about +1.2 V to about +1.3 V.

Clause B3. The process of Clause B1, wherein the final potential of the plurality of second voltage cycles is at least about +1.3 V.

Clause B4. The process of any one of Clauses B1-B3, wherein (f) comprises repeating (d) and (e) at least 40 times at a sweep rate of about 10 mV/s to about 100 mV/s.

Clause B5. The process of any one of Clauses B1-B4, wherein:

the one or more Group 8-11 metals comprises Fe, Ru, Os, Co, Rh, Ir, Ni, Pd, Cu, Ag, Au, or combinations thereof; and an amount of metal alloy nanoparticles present in the initial electrode is from about 10 wt % to about 80 wt % based on a total amount of the metal alloy nanoparticles and the carbon source, the total amount not to exceed 100 wt %.

Clause B6. The process of any one of Clauses B1-B5, wherein the one or more Group 8-11 metals is selected from the group consisting of Co, Ni, Fe, Cu, and combinations thereof.

Clause C1. A process for treating an electrode, comprising:

(a) performing a cycle of sweeping a first potential continuously at least 10 times in cyclic voltammetry on an initial electrode comprising a carbon supported catalyst, wherein the first potential comprises a range of a first initial potential to a first final potential, the first initial potential ranging from about 0 V to about +0.2 V, the first final potential ranging from about +0.9 V to about +1.1 V; and then (b) performing a cycle of sweeping a second potential continuously at least 20 times in cyclic voltammetry on the resultant electrode to form a final electrode, wherein the second potential comprises a range of a second initial potential to a second final potential, the second initial potential ranging from about −0.2 V to about 0 V, the second final potential ranging from about +1.2 V to about +1.5 V, the carbon supported catalyst comprising bimetallic alloy nanoparticles, trimetallic alloy nanoparticles, or combinations thereof, the bimetallic alloy nanoparticles and the trimetallic alloy nanoparticles comprising platinum and at least one Group 8-11 metal selected from the group consisting of Fe, Ru, Os, Co, Rh, Ir, Ni, Pd, Cu, Ag, Au, and combinations thereof.

Clause C2. The process of Clause C1, wherein (b) is performed for 40 times to 60 times and at a sweep rate of about 10 mV/s to about 100 mV/s.

Clause C3. The process of Clause C1 or Clause C2, wherein the catalyst comprises Pt and Ni.

As is apparent from the foregoing general description and the specific aspects, while forms of the aspects have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "Is" preceding the recitation of the composition, element, or elements and vice versa, e.g., the terms "comprising," "consisting essentially of," "consisting of" also include the product of the combinations of elements listed after the term.

As is apparent from the foregoing general description and the specific aspects, while forms of the aspects have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa, e.g., the terms "comprising," "consisting essentially of," "consisting of" also include the product of the combinations of elements listed after the term.

For purposes of this present disclosure, and unless otherwise specified, all numerical values within the detailed description and the claims herein are modified by "about" or "approximately" the indicated value, and consider experimental error and variations that would be expected by a person having ordinary skill in the art. For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

As used herein, the indefinite article "a" or "an" shall mean "at least one" unless specified to the contrary or the context clearly indicates otherwise. For example, aspects comprising "a metal" include aspects comprising one, two, or more metals, unless specified to the contrary or the context clearly indicates only one metal is included.

While the foregoing is directed to aspects of the present disclosure, other and further aspects of the disclosure may be devised without departing from the basic scope thereof, and the scope thereof is determined by the claims that follow.

What is claimed is:

1. A process for making an electrode comprising carbon-supported metal alloy nanoparticles, the process comprising:

applying a plurality of first voltage cycles from about 0 V to about +1.1 V to an initial electrode to form a resultant electrode, the initial electrode comprising:

metal alloy nanoparticles comprising platinum and one or more Group 8-11 metals, the one or more Group 8-11 metals free of Pt; and a carbon source; and then applying to the resultant electrode a plurality of second voltage cycles from an initial potential ranging from about-0.2 V to about 0 V to a final potential of at least +1.2 V to form a final electrode, the metal alloy nanoparticles of the final electrode having an oxygen reduction reaction (ORR) mass activity that is greater than the ORR mass activity of the initial electrode.

2. The process of claim 1, wherein the ORR mass activity of the final electrode is about 20% or more than the ORR mass activity of the initial electrode.

3. The process of claim 1, wherein the plurality of first voltage cycles comprises:

from about 10 to about 50 first voltage cycles; and each first voltage cycle comprises:

increasing the voltage from about 0 V to about +1.1 V at a scan rate of about 10 mV/s to about 500 mV/s; and decreasing the voltage from about +1.1 V to about 0 V at a scan rate of about 10 mV/s to about 500 mV/s.

4. The process of claim 1, wherein the plurality of second voltage cycles comprises:

from about 20 to about 150 second voltage cycles; and each second voltage cycle comprises:

increasing the voltage from an initial potential ranging from about-0.2 V to about 0 V to a final potential ranging from about +1.2 to about +1.5 V at a scan rate of about 10 mV/s to about 500 mV/s; and decreasing the voltage from the initial potential to the final potential at a scan rate of about 10 mV/s to about 500 mV/s.

5. The process of claim 1, wherein each second voltage cycle comprises:

increasing the voltage from an initial potential ranging from about-0.2 V to about 0 V to a final potential ranging from about +1.2 to about +1.3 V at a scan rate of about 10 mV/s to about 500 mV/s; and decreasing the voltage from the initial potential to the final potential at a scan rate of about 10 mV/s to about 500 mV/s.

6. The process of claim 1, wherein the one or more Group 8-11 metals comprises Fe, Ru, Os, Co, Rh, Ir, Ni, Pd, Cu, Ag, Au, or combinations thereof.

7. The process of claim 1, wherein the one or more Group 8-11 metals comprises Co, Ni, Fe, Cu, or combinations thereof.

8. The process of claim 1, wherein:

an amount of metal alloy nanoparticles present in the initial electrode is from about 10 wt % to about 80 wt % based on a total amount of the metal alloy nanoparticles and the carbon source, the total amount not to exceed 100 wt %; and an amount of carbon source present in the initial electrode is from about 20 wt % to about 90 wt % based on the total amount of the metal alloy nanoparticles and the carbon source.

9. The process of claim 1, wherein:

an amount of metal alloy nanoparticles present in the initial electrode is from about 20 wt % to about 60 wt % based on a total amount of the metal alloy nanoparticles and the carbon source, the total amount not to exceed 100 wt %; and an amount of carbon source present in the initial electrode is from about 40 wt % to about 80 wt % based on the total amount of the metal alloy nanoparticles and the carbon source.

10. The process of claim 1, wherein the metal alloy nanoparticles comprises Pt and Cu.

11. The process of claim 10, wherein the metal alloy nanoparticles further comprises Ni.

12. A process for improving an oxygen reduction reaction (ORR) mass activity of a carbon supported catalyst, the process comprising:

exposing an initial electrode comprising a carbon supported catalyst to a plurality of first voltage cycles to form a resultant electrode, comprising:

(a) ramping the voltage from about 0 V to about +1.1 V;

(b) ramping the voltage from about +1.1 V to about 0 V; and (c) repeating (a) and (b) at least 10 times; and then exposing the resultant electrode to a plurality of second voltage cycles to form a final electrode, comprising:

(d) ramping the voltage from an initial potential ranging from about-0.2 V to about 0 V to a final potential ranging from about +1.2 V to about +1.5 V;

(e) ramping the voltage from the final potential to the initial potential; and (f) repeating (d) and (e) at least 20 times, wherein the carbon supported catalyst comprises metal alloy nanoparticles and a carbon source, the metal alloy nanoparticles comprising Pt and one or more Group 8-11 metals, the one or more Group 8-11 metals free of Pt; and wherein the final electrode has an oxygen reduction reaction mass activity that is at least 20% more than the ORR mass activity of the initial electrode.

13. The process of claim 12, wherein the final potential of the plurality of second voltage cycles is from about +1.2 V to about +1.3 V.

14. The process of claim 12, wherein the final potential of the plurality of second voltage cycles is at least about +1.3 V.

15. The process of claim 12, wherein (f) comprises repeating (d) and (e) at least 40 times at a sweep rate of about 10 mV/s to about 100 mV/s.

16. The process of claim 12, wherein:

the one or more Group 8-11 metals comprises Fe, Ru, Os, Co, Rh, Ir, Ni, Pd, Cu, Ag, Au, or combinations thereof; and an amount of metal alloy nanoparticles present in the initial electrode is from about 10 wt % to about 80 wt % based on a total amount of the metal alloy nanoparticles and the carbon source, the total amount not to exceed 100 wt %.

17. The process of claim 12, wherein the one or more Group 8-11 metals is selected from the group consisting of Co, Ni, Fe, Cu, and combinations thereof.

18. A process for treating an electrode, comprising:

(a) performing a cycle of sweeping a first potential continuously at least 10 times in cyclic voltammetry on an initial electrode comprising a carbon supported catalyst, wherein the first potential comprises a range of a first initial potential to a first final potential, the first initial potential ranging from about 0 V to about +0.2 V, the first final potential ranging from about +0.9 V to about +1.1 V to form a resultant electrode; and then (b) performing a cycle of sweeping a second potential continuously at least 20 times in cyclic voltammetry on the resultant electrode to form a final electrode, wherein the second potential comprises a range of a second initial potential to a second final potential, the second initial potential ranging from about-0.2 V to about 0 V, the second final potential ranging from about +1.2 V to about +1.5 V, the carbon supported catalyst comprising bimetallic alloy nanoparticles, trimetallic alloy nanoparticles, or combinations thereof, the bimetallic alloy nanoparticles and the trimetallic alloy nanoparticles comprising platinum and at least one Group 8-11 metal selected from the group consisting of Fe, Ru, Os, Co, Rh, Ir, Ni, Pd, Cu, Ag, Au, and combinations thereof.

19. The process of claim 18, wherein (b) is performed for 40 times to 60 times and at a sweep rate of about 10 mV/s to about 100 mV/s.

20. The process of claim 18, wherein the catalyst comprises Pt and Ni.

* * * * *